US008572653B2

(12) United States Patent  
Kim et al.

(10) Patent No.: US 8,572,653 B2  
(45) Date of Patent: Oct. 29, 2013

(54) IMAGE DISPLAY APPARATUS AND METHOD FOR OPERATING THE SAME

(75) Inventors: Jongseok Kim, Seoul (KR); Jaeuk Kim, Seoul (KR)

(73) Assignee: LG Electronics Inc., Seoul (KR)

(*) Notice: Subject to any disclaimer, the term of this patent is extended or adjusted under 35 U.S.C. 154(b) by 216 days.

(21) Appl. No.: 13/044,340

(22) Filed: Mar. 9, 2011

(65) Prior Publication Data

US 2012/0054794 A1    Mar. 1, 2012

Related U.S. Application Data

(60) Provisional application No. 61/379,369, filed on Sep. 1, 2010.

(30) Foreign Application Priority Data

Sep. 2, 2010    (KR) .......................... 10-2010-0086151

(51) Int. Cl.
*G06F 13/00* (2006.01)
*G06F 3/00* (2006.01)

(52) U.S. Cl.
USPC .................................. 725/44; 725/38; 725/43

(58) Field of Classification Search
USPC .......................................... 725/38, 43–44, 59
See application file for complete search history.

(56) References Cited

U.S. PATENT DOCUMENTS

| 5,883,621 | A | * | 3/1999 | Iwamura | 725/37 |
| 6,005,601 | A | * | 12/1999 | Ohkura et al. | 725/52 |
| 6,028,600 | A | * | 2/2000 | Rosin et al. | 715/718 |
| 7,721,311 | B2 | * | 5/2010 | Kowald et al. | 725/52 |
| 2009/0138922 | A1 | * | 5/2009 | Thomas et al. | 725/87 |
| 2009/0322676 | A1 | | 12/2009 | Kerr et al. | |
| 2011/0234480 | A1 | | 9/2011 | Fino et al. | |

FOREIGN PATENT DOCUMENTS

| KR | 10-2006-0047812 | 5/2006 |
| KR | 10-2007-0040331 | 4/2007 |

OTHER PUBLICATIONS

International Search Report issued in PCT Appln No. PCT/KR2011/001697 dated Oct. 20, 2011.

* cited by examiner

*Primary Examiner* — Hunter B Lonsberry  
(74) *Attorney, Agent, or Firm* — KED & Associates, LLP

(57) ABSTRACT

A multifunctional display device and a method of controlling the same are disclosed herein. The method may include displaying a first card object in a first area of the display, displaying a second card object in a second area of the display, and partially displaying a third card object in a third area of the display to indicate that additional card objects are available for display. The first card object may be configured to display a video image and the second card object may have at least one link for connecting to a server. Based on a request to change the displayed card objects, the third card object may be displayed in the second area of the display and a fourth card object may be partially displayed in the third area of the display.

30 Claims, 41 Drawing Sheets

(a)   (b)

(a)   (b)

IMAGE DISPLAY APPARATUS AND METHOD FOR OPERATING THE SAME

CROSS-REFERENCE TO RELATED APPLICATION(S)

This application claims the benefit of Korean Patent Application No. 10-2010-0086151, filed in Korea on Sep. 2, 2010 in the Korean Intellectual Property Office, and U.S. Provisional Patent Application No. 61/379,369 filed in USA on Sep. 1, 2010 in the USPTO, the disclosure of which is hereby incorporated by reference in its entirety.

BACKGROUND

1. Field

A display apparatus and a method for operating the same are disclosed herein.

2. Background

Display apparatuses and methods for operating the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Figure 1:
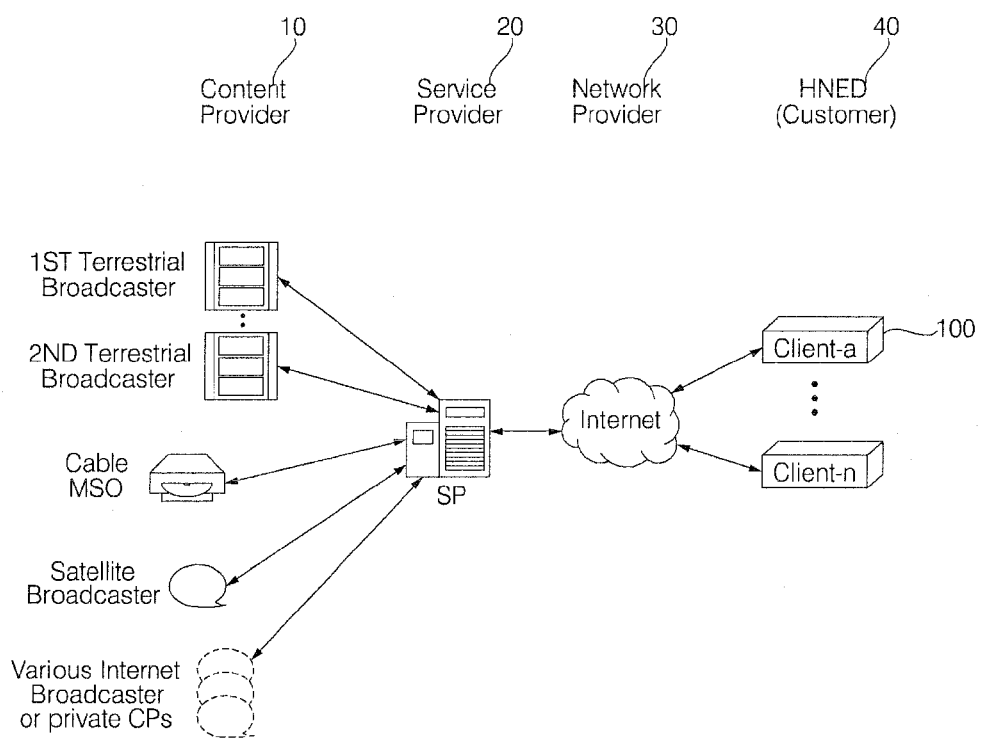
FIG. 1 is a diagram of a configuration of a broadcasting system that includes an image display apparatus according to an embodiment of the present disclosure.

FIG. 1 is a diagram of a configuration of a broadcasting system that includes an image display apparatus according to an embodiment of the present disclosure. Referring to FIG. 1, the broadcasting system may include a Content Provider (CP) 10, a Service Provider (SP) 20, a Network Provider (NP) 30, and a Home Network End Device (HNED) 40. The HNED 40 corresponds to, for example, a client 100 which is an image display apparatus according to an embodiment. The image display apparatus may be a network TV, a smart TV, an Internet Protocol TV (IPTV), etc.

The CP 10 may create and provide content. The CP 10 may be, for example, a terrestrial broadcaster, a cable System Operator (SO) or Multiple System Operator (MSO), a satellite broadcaster, an Internet broadcaster, as illustrated in FIG. 1, or another appropriate content provider. Besides broadcast content, the CP 10 may also provide various applications.

The SP 20 may provide content received from the CP 10 in a service package. For instance, the SP 20 may package a first terrestrial broadcasting, second terrestrial broadcasting, cable broadcasting, satellite broadcasting, Internet broadcasting, and/or applications and may provide the package to users. The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server may transmit the data to a single receiver.

Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service may be provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
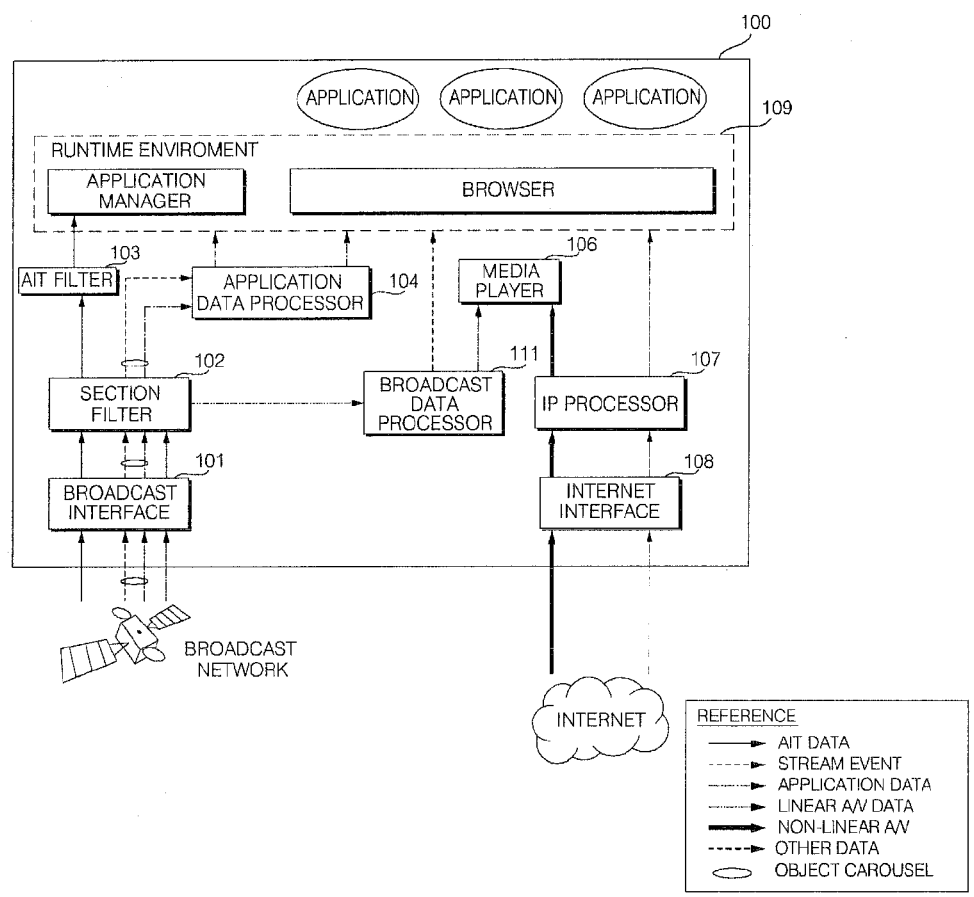
FIG. 2 shows a broadcasting system including an image display apparatus according to another embodiment of the present disclosure.

FIG. 2 shows a broadcasting system including an image display apparatus according to another embodiment of the present disclosure. Referring to FIG. 2, the image display apparatus 100 may be connected to a broadcast network and the Internet. The image display apparatus 100 may be, for example, a network TV, a smart TV, an HbbTV, or another appropriate multifunctional display device. The image display apparatus 100 may include, for example, a broadcast interface 101, a section filter 102, an Application Information Table (AIT) filter 103, an application data processor 104, a broadcast data processor 111, a media player 106, an IP processor 107, an Internet interface 108, and a runtime module 109. The image display apparatus 100 may receive AIT data, real-time broadcast content, application data, and stream events through the broadcast interface 101. The real-time broadcast content may be referred to as a linear Audio/Video (A/V) content.

The section filter 102 may perform section filtering on the four types of data received through the broadcast interface 101. The section filter 102 may output the AIT data to the AIT filter 103, the linear A/V content to the broadcast data processor 111, and the stream events and application data to the application data processor 104.

Meanwhile, the image display apparatus 100 may receive non-linear A/V content and application data through the Internet interface 108. The non-linear A/V content may be, for example, a Content On Demand (CoD) application. The non-linear A/V content and the application data may be transmitted to the media player 106 and the runtime module 109, respectively. The runtime module 109 may include, for example, an application manager and a browser as illustrated in FIG. 2. The application manager controls the life cycle of an interactive application using the AIT data, for example. The browser displays and processes the interactive application.

Figure 3:
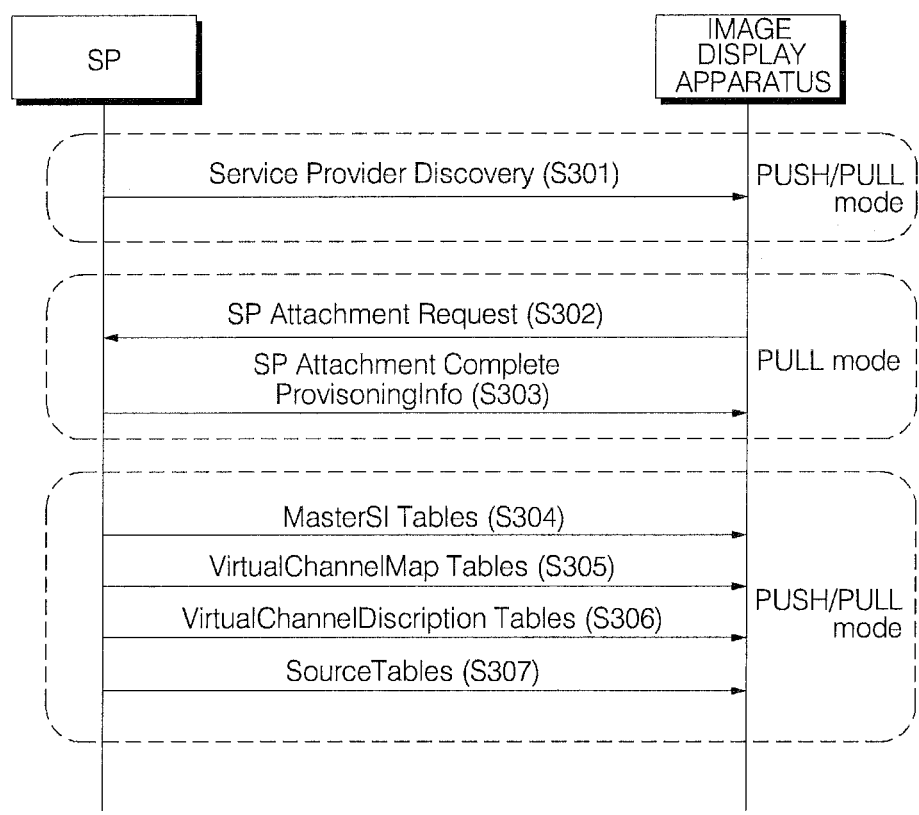
FIG. 3 is a diagram illustrating a signal flow between a Service Provider (SP) and an image display apparatus of FIG. 1 or 2, according to an embodiment of the present disclosure.

FIG. 3 illustrates an operation for connecting to an SP and receiving channel information from the SP in the image display apparatus of FIG. 1 or 2. Referring to FIG. 3, an SP may perform an SP Discovery operation (S301) and the image display apparatus may transmit a Service Provider Attachment Request signal to the SP (S302). Upon completion of attachment to the SP, the image display apparatus may receive provisioning information from the SP (S303). Further, the image display apparatus may receive Master System Information (SI) Tables, Virtual Channel Map Tables, Virtual Channel Description Tables, and Source Tables from the SP (S304 to S307). More specifically, SP Discovery is a process by which SPs that provide IPTV services may search for Service Discovery (SD) servers having information about the offerings of the SPs.

In order to receive information about the SD servers, an SD server address list can be detected, for example, using three methods. Specifically, the SD server address list may be obtained by an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record may include information needed to perform Service Discovery on an SP basis. The image display apparatus may then start a Service Discovery operation using the SP Discovery record. These operations can be performed in a push mode or a pull mode.

The image display apparatus may access an SP attachment server specified by an SP attachment locator included in the SP Discovery record and performs a registration procedure (or a service attachment procedure). Further, after accessing an authentication service server of an SP specified by an SP authentication locator and performing an authentication procedure, the image display apparatus may perform a service authentication procedure. After service attachment is successfully performed, a server may transmit data in the form of a provision information table to the image display apparatus.

During service attachment, the image display apparatus may include an Identifier (ID) and location information thereof in data, and transmit the data to the service attachment server. Thus, the service attachment server may specify a service that the image display apparatus has subscribed to based on the ID and location information. In addition, the service attachment server may provide, in the form of a provisioning information table, address information from which the image display apparatus can obtain Service Information (SI). The address information may correspond to access information about a Master SI Table. This method facilitates provisioning of a customized service to each subscriber.

The SI may be divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
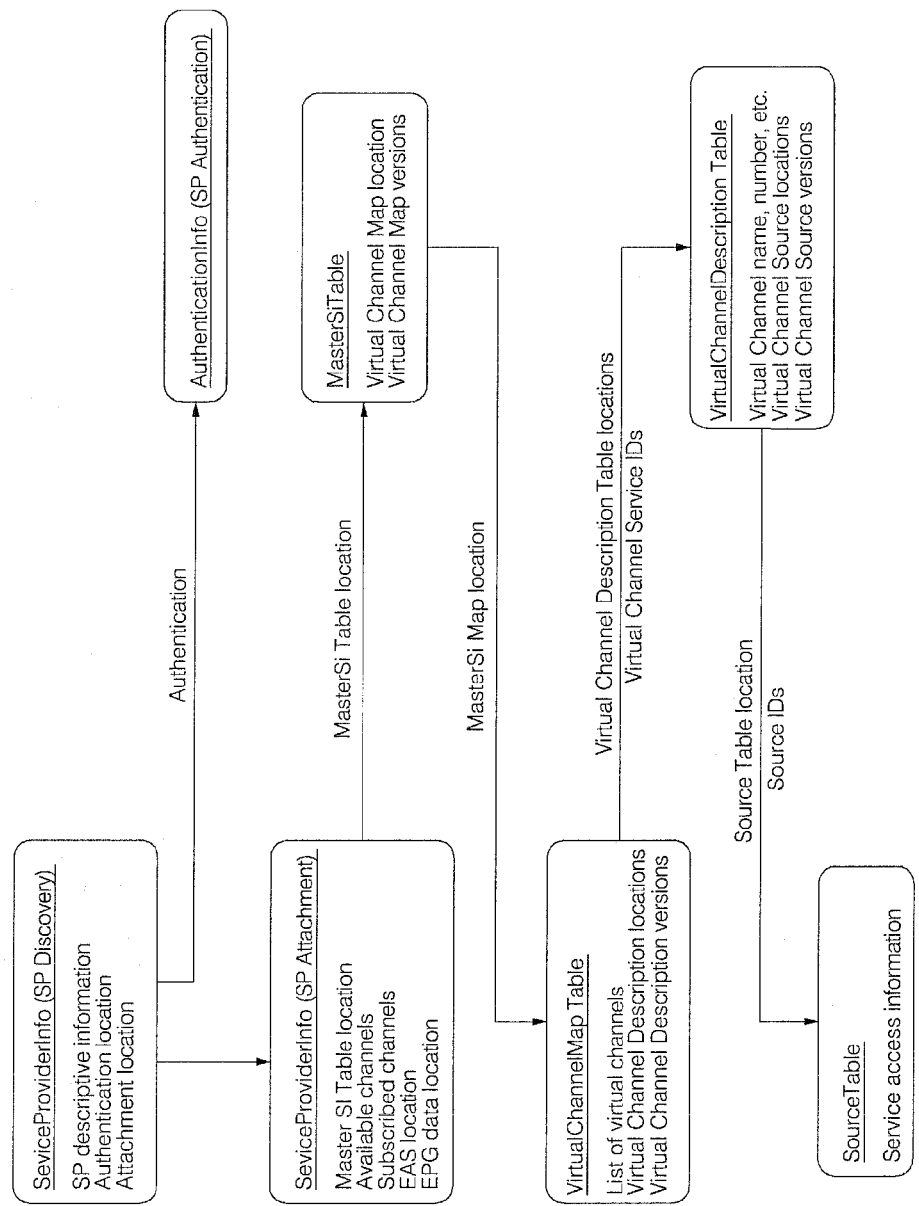
FIG. 4 illustrates data accessed during the operation of FIG. 3.

FIG. 4 illustrates an example of data used in the signal flow illustrated in FIG. 3, and a relationship among data in the SI. Referring to FIG. 4, a Master SI Table may contain information about the location and version of each Virtual Channel MAP. Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. Hence, a change in any lower table may lead to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus, it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table may be delivered in four logically separate flows, in a push mode or a pull mode. For version management, the Master SI Table may be multicast, and thus, a version change may be monitored by receiving a multicast stream of the Master SI Table.

Figure 5:
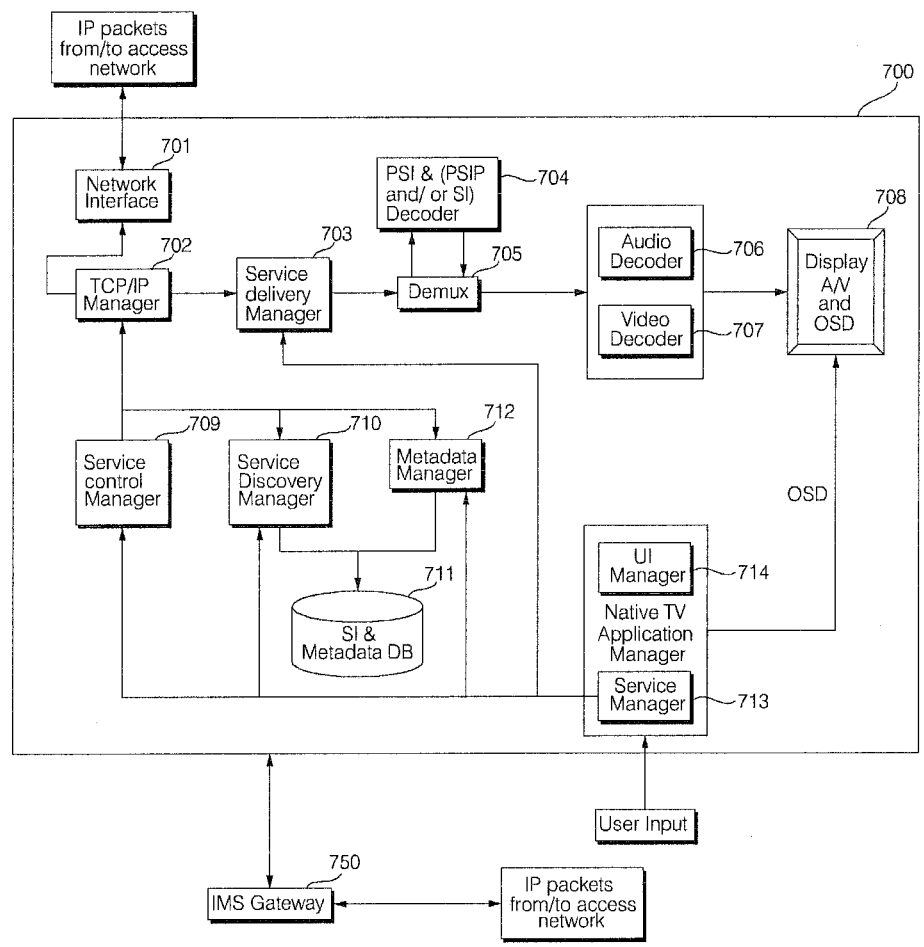
FIG. 5 is a block diagram of an image display apparatus according to an embodiment of the present disclosure.

FIG. 5 is a detailed block diagram of the image display apparatus of FIG. 1 or 2 according to an embodiment of the present disclosure. Referring to FIG. 5, an image display apparatus 700 may includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, a service manager 713, or another appropriate component based on the application of the display apparatus.

The network interface 701 may transmit packets to and receives packets from a network. Specifically, the network interface 701 may receive services and content from an SP over the network.

The TCP/IP manager 702 is involved in packet reception and transmission of the image display apparatus 700, that is, packet delivery from a source to a destination. The TCP/IP manager 702 may classify received packets according to appropriate protocols and may output the classified packets to the service delivery manager 705, the service discovery manager 710, the service control manager 709, and/or the metadata manager 712.

The service delivery manager 703 may control received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 may parse the received real-time streaming data using RTP and output the parsed real-time streaming data to the DEMUX 705. The service deliver manager 703 may also store the parsed real-time streaming data in the SI & metadata DB 711 under the control of the service manager 713. In addition, the service delivery manager 703 may feed back network reception information to a server that provides the real-time streaming data service using RTCP.

The DEMUX 705 may demultiplex a received packet into audio data, video data, and PSI data and outputs the audio data, video data, and PSI data to the audio decoder 706, the video decoder 707, and the PSI & (PSIP and/or SI) decoder 704, respectively.

The PSI & (PSIP and/or SI) decoder 704 may decode SI such as PSI. More specifically, the PSI & (PSIP and/or SI) decoder 704 may decode PSI sections, PSIP sections, or SI sections received from the DEMUX 705. The PSI & (PSIP and/or SI) decoder 704 may construct an SI DB by decoding the received sections and may store the SI DB in the SI & metadata DB 711.

The audio decoder 706 and the video decoder 707 may decode the audio data and the video data received from the DEMUX 705 and may output the decoded audio and video data through the display A/V and OSD module 708.

The UI manager 714 and the service manager 713 may manage the overall state of the image display apparatus 700, provide UIs, and manage other managers. The UI manager 714 may provide a Graphical User Interface (GUI) in the form of an OSD and may perform a reception operation corresponding to a key input received from the user. For example, upon receipt of a key input signal regarding channel selection from the user, the UI manager 714 may transmit the key input signal to the service manager 713.

The service manager 713 may control managers associated with services, such as the service delivery manager 703, the service discovery manager 710, the service control manager 709, and/or the metadata manager 712. The service manager 713 may also make a channel map and may select a channel using the channel map according to the key input signal received from the UI manager 714. The service manager 713 may set the audio/video Packet ID (PID) of the selected channel based on SI about the channel received from the PSI & (PSIP and/or SI) decoder 704.

The service discovery manager 710 may provide information necessary to select an SP that provides a service. Upon receipt of a channel selection signal from the service manager 713, the service discovery manager 710 may detect a service based on the channel selection signal.

The service control manager 709 may manage selection and control services. For example, if a user selects live broadcasting, such as a conventional broadcasting service, the service control manager may select and control the service using Internet Group Management Protocol (IGMP) or Real-Time Streaming Protocol (RTSP). If the user selects Video on Demand (VoD), the service control manager 709 may select and control the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols disclosed herein are given by way of example, and other protocols may be applicable in other embodiments.

The metadata manager 712 may manage metadata related to services and store the metadata in the SI & metadata DB 711. The SI & metadata DB 711 may store the SI decoded by the PSI & (PSIP and/or SI) decoder 704, the metadata managed by the metadata manager 712, and the information required to select an SP, received from the service discovery manager 710. The SI & metadata DB 711 may store setup data for the system. The SI & metadata DB 711 may be constructed in a Non-Volatile RAM (NVRAM) or a flash memory. Moreover, an IMS gateway 705 is a gateway equipped with functions needed to access IMS-based IPTV services.

Figure 6:
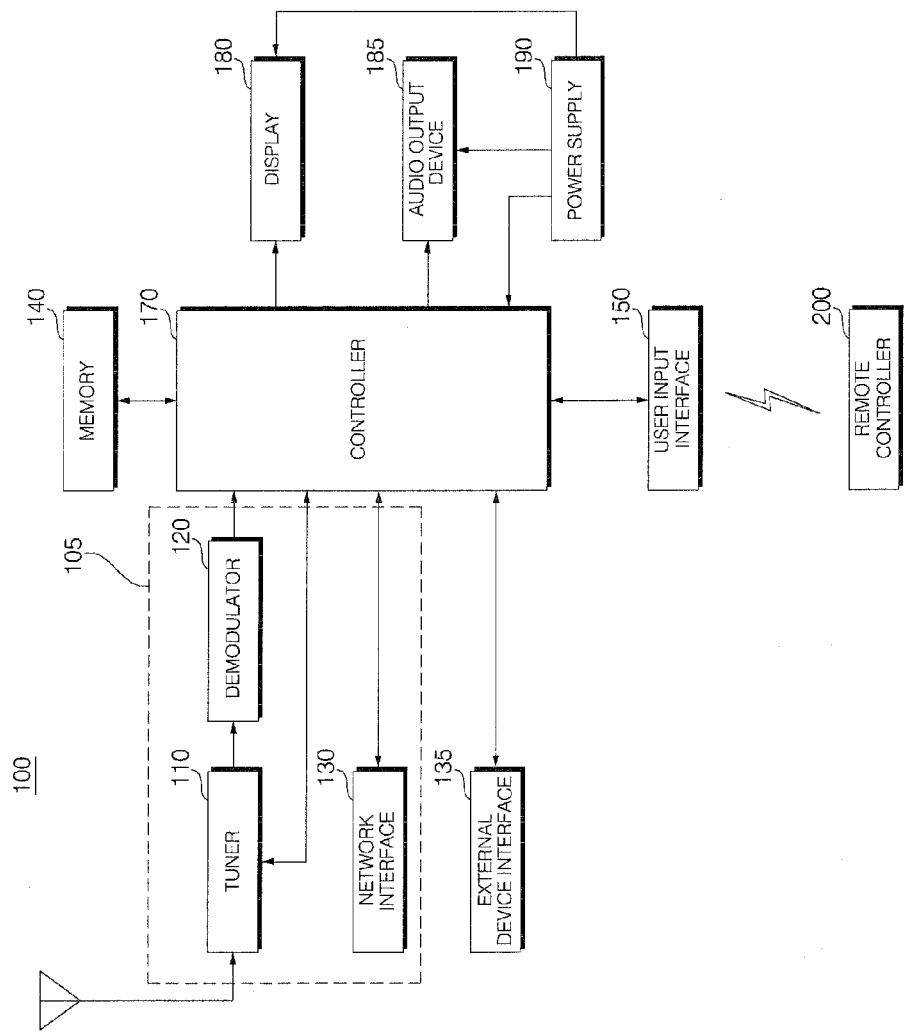
FIG. 6 is a block diagram of an image display apparatus according to another embodiment of the present disclosure.

FIG. 6 is a block diagram of the image display apparatus of FIG. 1 or 2 according to another embodiment of the present disclosure. Referring to FIG. 6, the image display apparatus 100 may include a broadcasting receiver 105, an external device interface 135, a memory 140, a user input interface 150, a controller 170, a display 180, an audio output circuit 185, a power supply 190, a camera module, or another appropriate component based on the application of the display apparatus 100. The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna. The tuner 110 may downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The broadcast signal may be input through the external device interface 135 or network interface 130 in addition to the tuner 110. In one embodiment, the image display apparatus may not include the tuner.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder, a de-interleaver, and/or a Reed-Solomon decoder so as to perform convolution decoding, de-interleaving, and/or Reed-Solomon decoding, respectively.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload. In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output circuit 185, respectively.

The external device interface 135 may serve as an interface between an external device and the image display apparatus 100. For interfacing, the external device interface 135 may include an A/V Input/Output (I/O) interface and/or a wireless communication module.

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 179 to the external device. In order to receive or transmit audio, video, and data signals from or to the external device, the external device interface 135 may includes the A/V I/O interface and/or the wireless communication module.

The A/V I/O interface of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, a D-sub port, or another appropriate port for connecting to an external device.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports, and thus, may receive data from or transmit data to the various set-top boxes. The external device interface 135 may receive applications or an application list from an adjacent external device and provide the applications or the application list to the controller 170 or the memory 140.

The network interface 130 may serve as an interface between the image display apparatus 100 and a wired/wireless network such as the Internet. The network interface 130 may include an Ethernet port for connection to a wired network. The wireless communication module of the external signal I/O circuit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), High Speed Downlink Packet Access (HSDPA), or another wireless communication protocol.

The network interface 130 may transmit data to or receive data from another user or electronic device over a connected network or another network linked to the connected network. For example, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, broadcast signals as well as information related to the content from a CP or an NP. Also, the network interface 130 may receive update information about firmware and update files of the firmware from the NP. The network interface 130 may transmit data over the Internet or to the CP or the NP. The network interface 130 may selectively receive a desired application among open applications over a network.

In an embodiment of the present disclosure, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals. The memory 140 may temporarily store a video, audio and/or data signal received from the external device interface 135 or the network interface 130. The memory 140 may store information about broadcast channels by the channel-add function. The memory 140 may store applications or a list of applications received from the external device interface 135 or the network interface 130. The memory 140 may also store a variety of platforms. In one embodiment, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), a Read-Only Memory (ROM) such as an Electrically Erasable and Programmable Read Only Memory, or another appropriate type of storage device. The image display apparatus 100 may reproduce content stored in the memory 140 (e.g. video files, still image files, music files, text files, or application files). While the memory 140 is shown in FIG. 6 as being configured to be separate from the controller 170, the present disclosure is not limited thereto. For example, the memory 140 may be incorporated into the controller 170.

The user input interface 150 transmits a signal received from the user to the controller 170 or transmits a signal received from the controller 170 to the user. For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys, such as inputs of a power key, a channel key, and a volume key, and setting values. Also, the user input interface 150 may transmit a control signal received from a sensor that senses a user gesture to the controller 170 or transmit a signal received from the controller 170 to the sensor. The sensor may include a touch sensor, a voice sensor, a position sensor, a motion sensor, or another appropriate type of sensor.

The controller 170 may demultiplex the stream signal TS received from the tuner 110, the demodulator 120, or the external device interface 135 into a number of signals and process the demultiplexed signals into audio and video data. The video signal processed by the controller 170 may be displayed as an image on the display 180. The video signal processed by the controller 170 may also be transmitted to an external output device through the external device interface 135. The audio signal processed by the controller 170 may be output to the audio output device 185. Also, the audio signal processed by the controller 170 may be transmitted to the external output device through the external device interface 135.

The controller 170 may include a DEMUX and a video processor. In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. The controller 170 may also access a network and download an application or application list selected by the user to the image display apparatus 100 over the network. For example, the controller 170 may control the tuner 110 to receive a channel selected according to a specific channel selection command received through the user input interface 150 and process a video, audio and/or data signal of the selected channel. The controller 170 may output the processed video or audio signal along with information about the user-selected channel to the display 180 or the audio output device 185.

The controller 170 may also output a video or audio signal received from an external device such as a camera or a camcorder through the external device interface 135 to the display 180 or the audio output device 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

In one embodiment, upon receipt of a go-to-home screen input, the controller 170 may control display of the home screen on the display 180. The home screen may include a plurality of card objects classified according to content sources. The card objects may include at least one card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list. The home screen may further include an application menu with at least one application that can be executed.

The image display apparatus according to the embodiment of the present disclosure may include a card object generator that generates and displays the card object. In one embodiment, the card object generator may be an OSD generator 340 or a functional part included in the controller or another component.

Upon receipt of a card object move input, the controller 170 may control movement of a card object corresponding to the card object move input on the display 180, or if the card object is not displayed on the display 180, the controller 170 may control the display to show the card object on the display 180. Examples of a display apparatus and method for moving or scrolling objects on the same are disclosed in U.S. patent application Ser. Nos. 13/044,310 and 13/044,331 which are hereby incorporated by reference in their entirety.

The controller 170 may control display of an input broadcast image and an object representing information about the broadcast image in a card object representing broadcast images. The broadcast image may be fixed in size through a lock setting. The controller 170 may also control a display of a set-up object for at least one of image setting, audio setting, screen setting, reservation setting, setting of a pointer controlled by the remote controller, or network setting on the home screen.

The controller 170 may control display of a login object, a help object, or an exit object on a part of the home screen. The controller 170 may also control display of an object representing the total number of available card objects or the number of card objects displayed on the display 180 among all card objects, on a part of the home screen. Moreover, if one of the card objects displayed on the display 180 is selected, the controller 170 may display the selected card object as a full screen image to cover the entirety of the display 180.

Upon receipt of an incoming call at a connected external device or the image display apparatus 100, the controller 170 may control the display to focus-on or shift a call-related card object among the plurality of card objects. Furthermore, if an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present disclosure, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180, and reception of a selection signal indicating a user terminal selected for use as a user controller from among the listed user terminals through the user input interface 150.

The controller 170 may control output of a game play screen of the game application, inclusive of player information about each user terminal and game play information, through the display 180. The controller 170 may determine the specific signal received from a user terminal through the network interface 130 as game play information, and thus, control the game play information to be reflected in the game application in progress. Moreover, the controller 170 may control transmission of the game play information about the game application to a specific server connected to the image display apparatus 100 over a network through the network interface 130. In one embodiment, upon receipt of information about a change in the game play information from the server through the network interface 130, the controller 179 may control output of a notification message in a predetermined area of the display 180.

The image display apparatus 100 may further include a channel browsing processor configured to generate thumbnail images corresponding to channel signals or external input signals. The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded.

Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

Examples of thumbnails and methods of using the same are disclosed in application Ser. No. 12/651,730, which is hereby incorporated by reference.

The display 180 may convert a processed video signal, a processed data signal, and an OSD signal received from the controller 170 or a video signal and a data signal received from the external device interface 135 into RGB signals to generate drive signals. The display 180 may be various types of displays such as a Plasma Display Panel (PDP), a Liquid Crystal Display (LCD), an Organic Light-Emitting Diode (OLED) display, a flexible display, a 3D display, or another appropriate type of display. The display 180 may also be a touch screen that can be used not only as an output device but also as an input device.

The audio output device 185 may receive a processed audio signal (e.g., a stereo signal, a 3.1-channel signal or a 5.1-channel signal) from the controller 170 and output the received audio signal as sound. The audio output device 185 may employ various speaker configurations.

To sense a user gesture, the image display apparatus 100 may further include a sensor circuit that has at least one of a touch sensor, a voice sensor, a position sensor, and a motion sensor, as stated before. A signal sensed by the sensor may be output to the controller 170 through the user input interface 150.

The image display apparatus 100 may further include the camera for capturing images of a user. Image information captured by the camera may be input to the controller 170. The controller 170 may sense a user gesture from an image captured by the camera or a signal sensed by the sensor. The controller 170 may also combine the captured image and the sensed signal to generate an input signal.

The power supply 190 supplies power to the image display apparatus 100. Particularly, the power supply 190 may supply power to the controller 170, the display 180, and the audio output device 185, which may be implemented as a System On Chip (SOC). The power supply 190 may include a converter for converting Alternating Current (AC) into Direct Current (DC). If the display 180 is configured with, for example, a liquid crystal panel having a plurality of backlight lamps, the power supply 190 may further include an inverter capable of performing Pulse Width Modulation (PWM) to control the luminance or dimming.

The remote controller 200 may transmit a user input to the user input interface 150. For transmission of user input, the remote controller 200 may use various communication techniques such as Bluetooth, RF communication, IR communication, UWB, ZigBee, or another appropriate communication protocol.

In addition, the remote controller 200 may receive a video signal, an audio signal or a data signal from the user input interface 150 and output the received signals visually, audibly, or as vibrations.

The above-described image display apparatus 100 may be a fixed digital broadcast receiver capable of receiving at least one of ATSC (8-VSB) broadcast programs, DVB-T (COFDM) broadcast programs, and/or ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output device 185, a DVD player, a Blu-ray player, a game console, a computer, or another appropriate device that processes image singals. The set-top box is described in further detail hereinbelow with reference to FIGS. 7 and 8.

Figure 7:
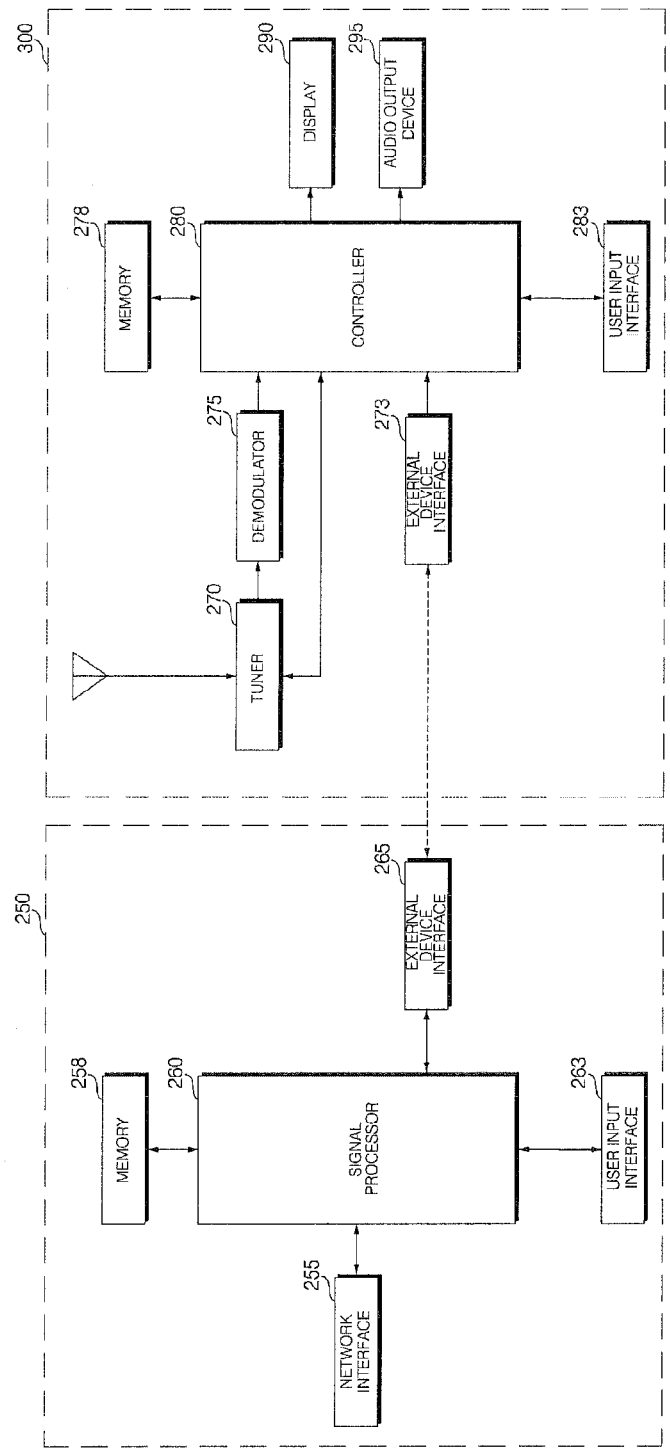
FIGS. 7 and 8 are block diagrams showing a set-top box and a display device of an image display apparatus according to an embodiment of the present disclosure.
Figure 8:
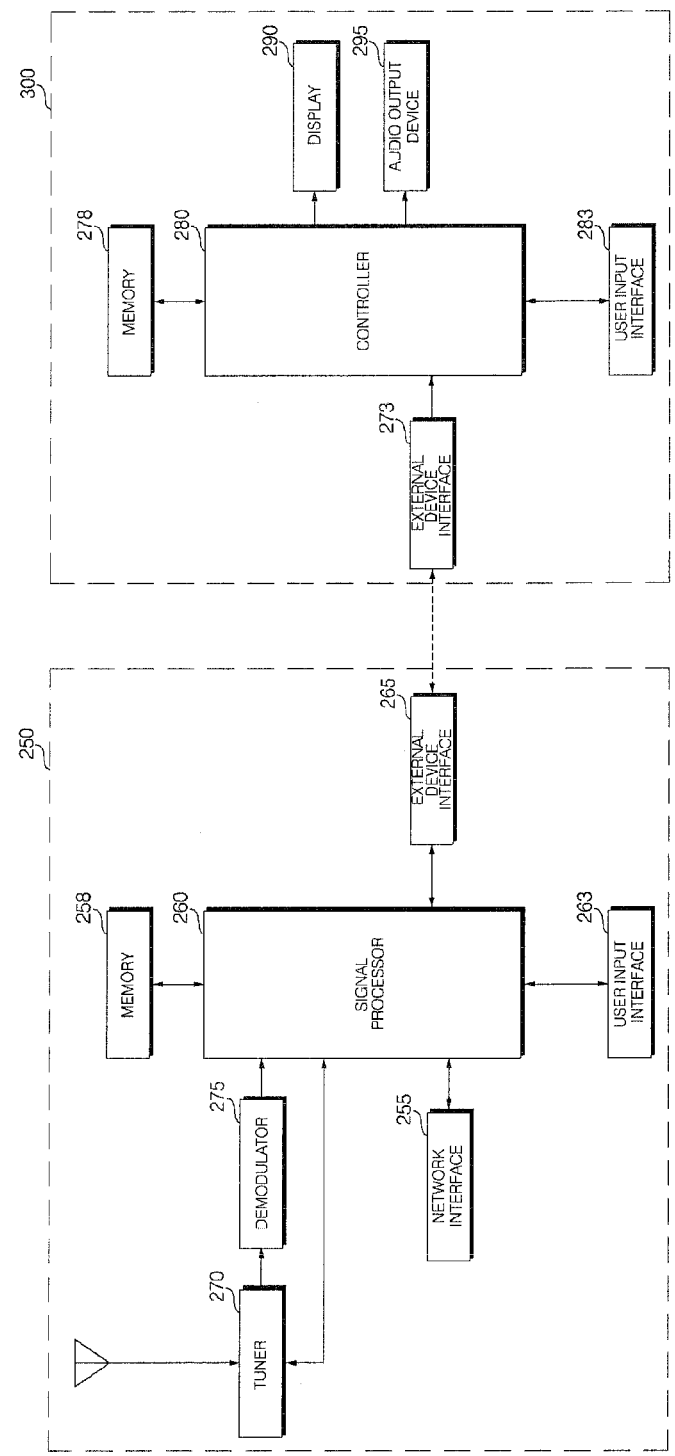

FIGS. 7 and 8 are block diagrams showing the image display apparatus configured separately as a set-top box and a display device. Referring to FIG. 7, a set-top box 250 and a display device 300 may transmit or receive data wirelessly or by wire. The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms, described in further detail with reference to FIGS. 11 and 12 hereinafter.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 may transmit a signal received from the user to the signal processor 260 or a signal received from the signal processor 260 to the user. For example, the user input interface 263 may receive various control signals such as a power on/off signal, an operation input signal, or a setting input signal through activation of a local key or the remote controller 200, and may output the control signals to the signal processor 260.

The external device interface 265 may serve as an interface between the set-top box 250 and an external device that is connected wirelessly or by wire, particularly the display device 300, for signal transmission or reception. The external device interface 265 may also interface with an external device such as a game console, a camera, a camcorder, a computer (e.g. a laptop computer), or another appropriate external device, for data transmission or reception.

The set-top box 250 may further include a media input device for media playback. The media input device may be a Blu-ray input device, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output device 295. The tuner 270, the demodulator 275, the memory 278, the controller 280, the user input interface 283, the display 290, and the audio output device 295 are identical respectively to the tuner 110, the demodulator 120, the memory 140, the controller 170, the user input interface 150, the display 180, and the audio output device 185 as described in reference to FIG. 6, and thus, a description thereof is not repeated hereinbelow.

The external device interface 273 serves as an interface between the display device 300 and a wireless or wired external device, particularly the set-top box 250, for data transmission or reception. Hence, a video signal or an audio signal received through the set-top box 250 may be output through the display 290 or the audio output unit 295 through the controller 280.

Referring to FIG. 8, the configuration of the set-top box 250 and the display device 300 illustrated in FIG. 8 is similar to that of the set-top box 250 and the display device 300 as described with reference to FIG. 7, except that the tuner 270 and the demodulator 275 are provided in the set-top box 250, not in the display device 300. Here, the signal processor 260 may process a broadcast signal received through the tuner 270 and the demodulator 275. The user input interface 263 may receive a channel selection input, a channel store input, etc.

Figure 9:
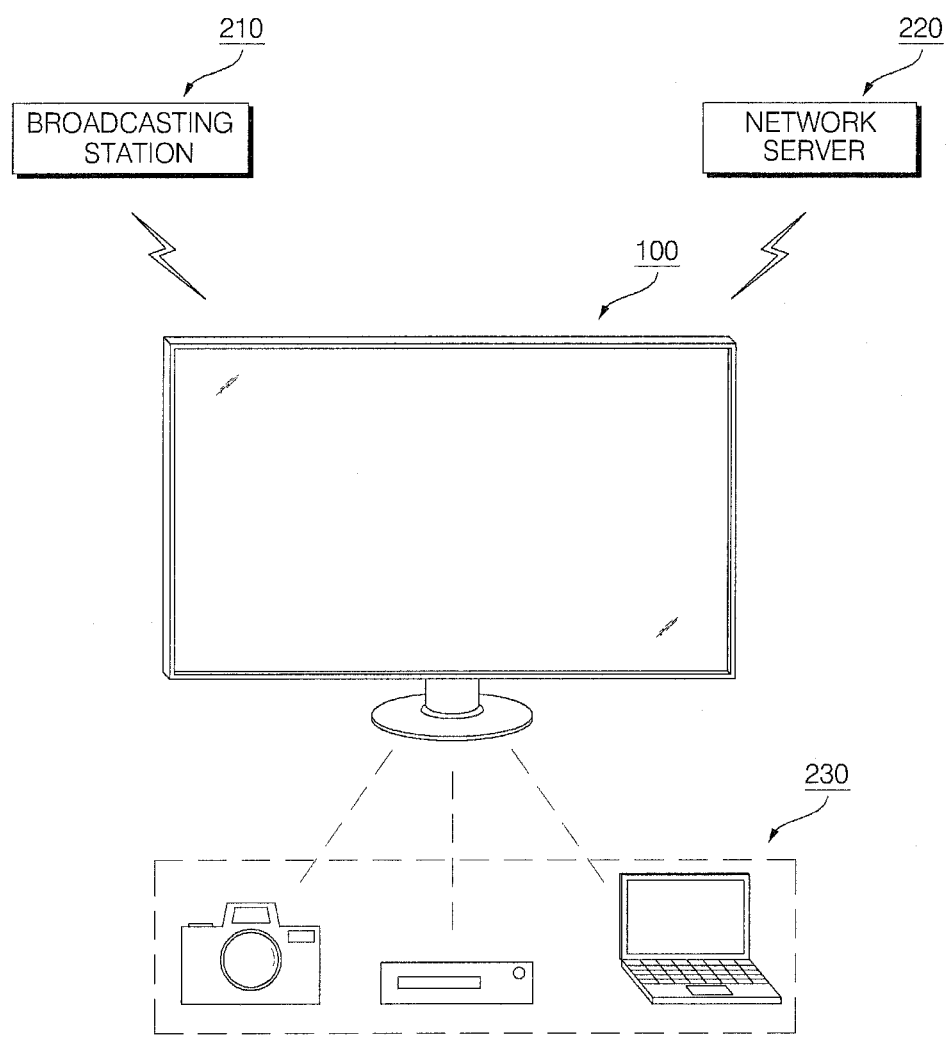
FIG. 9 shows a plurality of external devices in communication with an image display apparatus according to an embodiment of the present disclosure.

FIG. 9 illustrates an operation for communicating with third devices in the previously disclosed embodiments of the image display apparatus according to an embodiment. Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals embedded in the broadcast signal or the data signal of the broadcast signal, for example, into a format suitable for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a multimedia player. That is, the external device 230 may be any of a camera, a DVD player, a Blu-ray player, a PC, or another appropriate device based on the required functionality.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230, and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
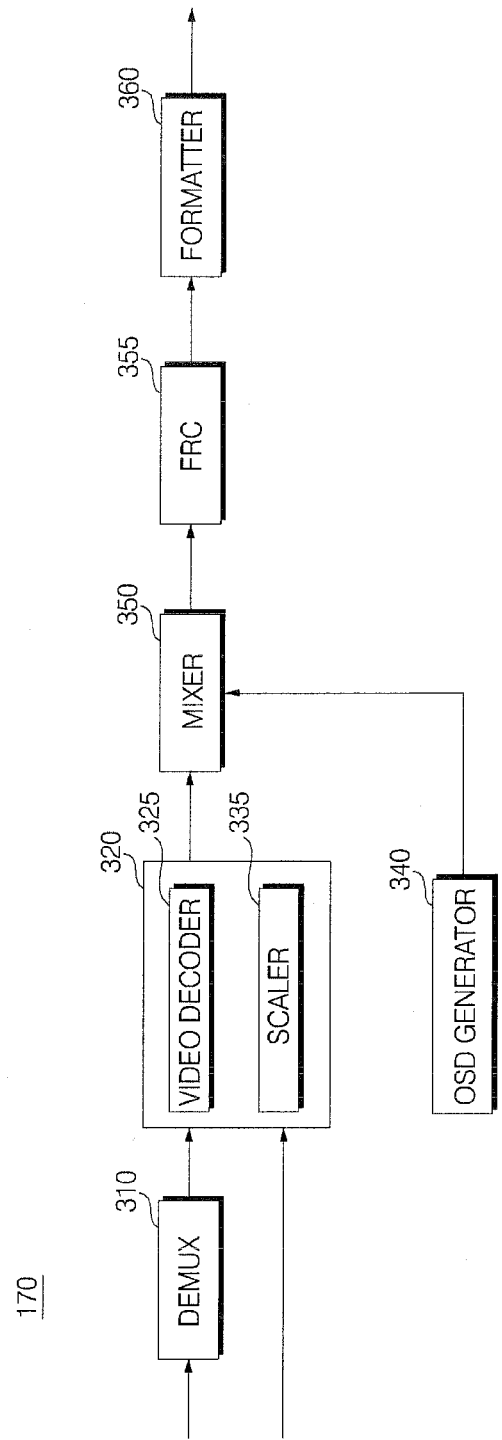
FIG. 10 is a block diagram of a controller of an image display apparatus according to an embodiment of the present disclosure.

FIG. 10 is a block diagram of the controller of FIG. 6. Referring to FIG. 10, the controller 170 may include a DEMUX 310, a video processor 320, an OSD generator 340, a mixer 350, a Frame Rate Converter (FRC) 355, and a formatter 360. The controller 170 may further include an audio processor and a data processor.

The DEMUX 310 may demultiplex an input stream. For example, the DEMUX 310 may demultiplex an MPEG-2 TS into a video signal, an audio signal, or a data signal. The input stream signal may be received from the tuner 110, the demodulator 120, or the external device interface 135.

The video processor 320 may process the demultiplexed video signal. For video signal processing, the video processor 320 may include a video decoder 325 and a scaler 335. The video decoder 325 decodes the demultiplexed video signal and the scaler 335 scales the resolution of the decoded video signal so that the video signal can be displayed on the display 180.

The video decoder 325 may be provided with decoders that operate based on various standards. If the demultiplexed video signal is, for example, an MPEC-2 encoded video signal, the video signal may be decoded by an MPEC-2 decoder. On the other hand, if the video signal is an H.264-encoded DMB or DVB-handheld (DVB-H) signal, the video signal may be decoded by an H.264 decoder. The video signal decoded by the video processor 320 may be provided to the mixer 350.

The OSD generator 340 may generate an OSD signal autonomously or based on to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc. For example, the OSD generator 340 may generate a signal by which subtitles are displayed with a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz may be converted into a frame rate of 120 or 240 Hz. When the frame rate is to be changed from 60 Hz to 120 Hz, a first frame may be inserted between the first frame and a second frame, or a predicted third frame may be inserted between the first and second frames. If the frame rate is to be changed from 60 Hz to 240 Hz, three identical frames or three predicted frames may be inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor of the controller 170 may process a demultiplexed audio signal. For audio signal processing, the audio processor may have a plurality of decoders. If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, an AC-3 decoder, or another type of decoder based on the format of the audio signal. The audio processor of the controller 170 may also adjust the bass, treble or volume of the audio signal.

The data processor of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI may be included in the header of a TS, i.e., a 4-byte header of an MPEG-2 TS.

The controller 170 as embodied and broadly described herein is not limited to the configuration as illustrated in the block diagram of FIG. 10. Depending upon the specifications of the controller 170, the components of the controller 170 may be combined, omitted, or additional components may be added to the controller 170.

Figure 11:
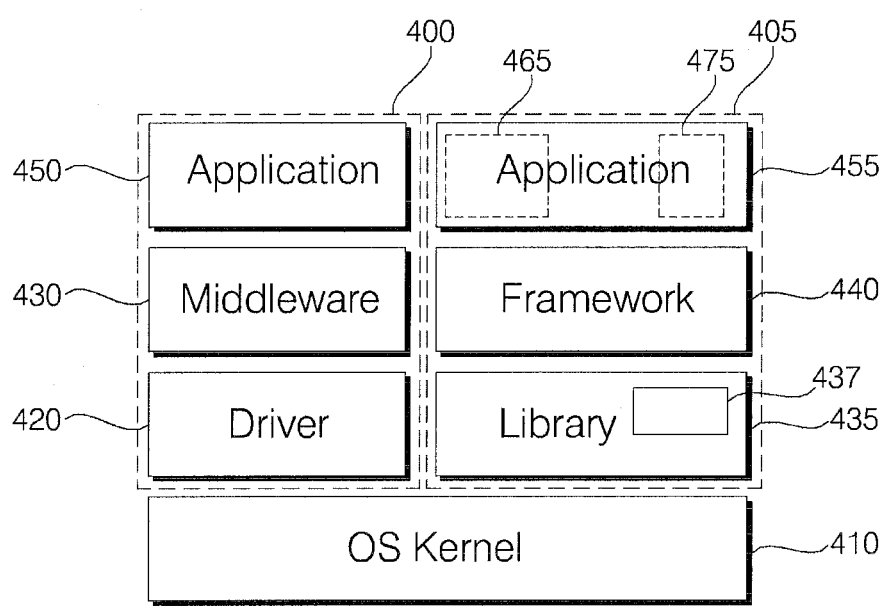
FIG. 11 illustrates a platform architecture for an image display apparatus according to an embodiment of the present disclosure.
Figure 12:
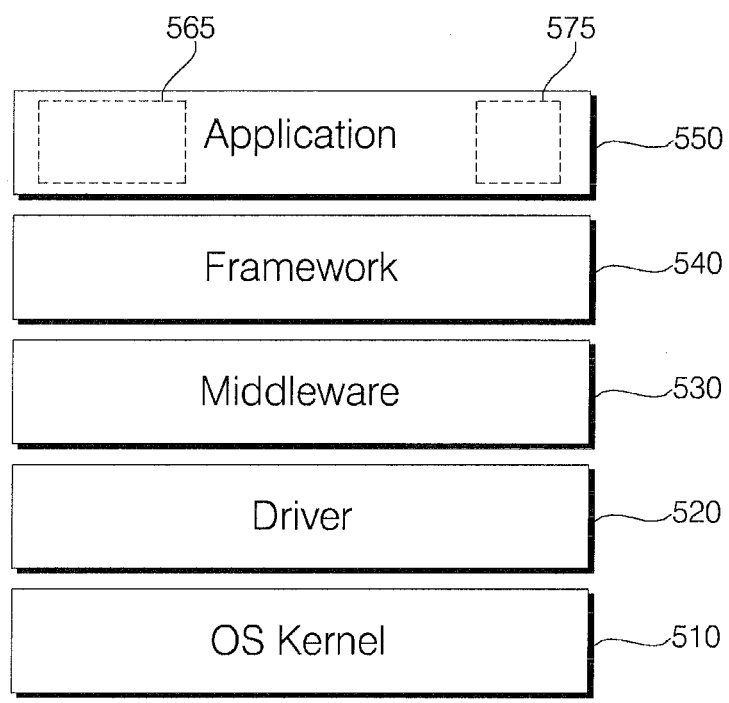
FIG. 12 illustrates a platform architecture for an image display apparatus according to another embodiment of the present disclosure.

FIG. 11 illustrates a platform architecture implemented in the image display apparatus according to one embodiment, and FIG. 12 illustrates another platform architecture implemented in the image display apparatus according to another embodiment.

A platform for the image display apparatus may have OS-based software to implement the above-described operations. Referring to FIG. 11, a platform for the image display apparatus may be a separate type. For example, the platform may be designed separately as a legacy system platform 400 and a smart system platform 405. An OS kernel 410 may be shared between the legacy system platform 400 and the smart system platform 405.

The legacy system platform 400 may include a stack including a driver 420, middleware 430, and an application layer 450 on the OS kernel 410. On the other hand, the smart system platform 405 may have a stack including a library 435, a framework 440, and an application layer 455 on the OS kernel 410.

The OS kernel 410 is the core of an operating system. When the image display apparatus is driven, the OS kernel 410 may be responsible for the operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management operations.

The hardware drivers of the OS kernel 410 may include, for example, at least one of a display driver, a Wi-Fi driver, a Bluetooth driver, a USB driver, an audio driver, a power manager, a binder driver, or a memory driver. Moreover, the hardware drivers of the OS kernel 410 may also include drivers for hardware devices within the OS kernel 410. The hardware drivers may include a character device driver, a block device driver, and/or a network device driver. The block device driver may need a buffer to buffer data on a block basis as data may be transmitted on a block basis. The character device driver may not need a buffer since data may be transmitted on a basic data unit basis, that is, on a character basis. The OS kernel 410 may be implemented based on any of various OSs such as Unix (Linux), Windows, etc. The OS kernel 410 may be a general-purpose open OS kernel which can be implemented in other electronic devices.

The driver 420 may be interposed between the OS kernel 410 and the middleware 430. Along with the middleware 430, the driver 420 may drive devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers may operate in conjunction with the hardware drivers of the OS kernel 410.

In addition, the driver 420 may further include a driver for the remote controller 200, especially a pointing device as described below. The remote controller driver may reside in the OS kernel 410 or the middleware 430, instead of the driver 420.

The middleware 430 may reside between the OS kernel 410 and the application layer 450. The middleware 430 may mediate between different hardware devices or different software programs for data transmission and reception between the hardware devices or the software programs. Therefore, the middleware 430 can provide standard interfaces, support various environments, and enable interaction between tasks conforming to heterogeneous communication protocols. Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, or DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program. The application layer 450 may further include at least one of a TV guide application, a Bluetooth application, a reservation application, a Digital Video Recorder (DVR) application, and a hot-key application.

In the smart system platform 405, the library 435 may be positioned between the OS kernel 410 and the framework 440, and may form the basis of the framework 440. For example, the library 435 may include Secure Socket Layer (SSL) being a security-related library, WebKit being a Web engine-related library, C library (libc), and Media Framework being a media-related library that specifies, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 may form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver of the OS kernel 410 may operate. The binder driver and the runtime 437 may connect Java applications to C-based libraries. The library 435 and the runtime 437 may correspond to the middleware 430 of the legacy system platform 400.

In the smart system platform 405, the framework 440 may include programs on which applications of the application layer 455 are based. The framework 440 may be compatible with any application and may allow component reuse, movement, or exchange. The framework 440 may include supporting programs and programs for interconnecting different software components. For example, the framework 440 may include an activity manager related to activities of applications, a notification manager, and/or a CP for abstracting common information between applications. This framework 440 may be written in Java.

The application layer 455 on top of the framework 440 may include a variety of programs that are executed and displayed in the image display apparatus. The application layer 455 may include, for example, a core application suite having at least one of an e-mail, Short Message Service (SMS), calendar, map, browser, or another appropriate application based on the desired functionality. The application layer 455 may be written in Java.

In the application layer 455, applications may be categorized into user-undeletable applications 465 or user-installed/deletable applications 475. User-undeletable applications 465 may be applications stored in the image display apparatus 100 that cannot be modified. User-installable or user-deletable applications 475 may include application which may be downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment may be an integrated type. The integrated platform may include an OS kernel 510, a driver 520, middleware 530, a framework 540, and an application layer 550. Compared to the separate-type platform, as illustrated in FIG. 11, the integrated-type platform is characterized by the absence of the library 435. Moreover, in this embodiment, the application layer 550 may be an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As previously described, the legacy system middleware may include MHEG or ACAP as data broadcasting-related middleware, PSIP or SI middleware as broadcasting information-related middleware, and DLNA middleware as peripheral device communication-related middleware, whereas the image display system middleware may include SSL as a security-related library, WebKit as a Web engine-related library, libc, and Media Framework as a media-related library. The middleware 530 may further include the runtime as previously described.

The application layer 550 may include a menu-related application, a TV guide application, a reservation application, etc. as legacy system applications. The application layer 550 may also include an e-mail, SMS, a calendar, a map, and/or a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may implement functions that provide connectivity to specific sub-routines for execution of the functions within a program. APIs may also be implemented as programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened. The various open APIs may allow developers to create applications executable in the image display apparatus 100 or applications required to control operations of the image display apparatus 100 based on the platforms as illustrated in FIGS. 11 and 12.

The platforms of FIGS. 11 and 12 may be general-purpose platforms that can be implemented in many other electronic devices as well as in the image display apparatus as disclosed herein. The platforms may be stored or loaded in the memory 140, the controller 170, or any other processor. To execute applications, an additional application processor may be further provided.

Figure 13:
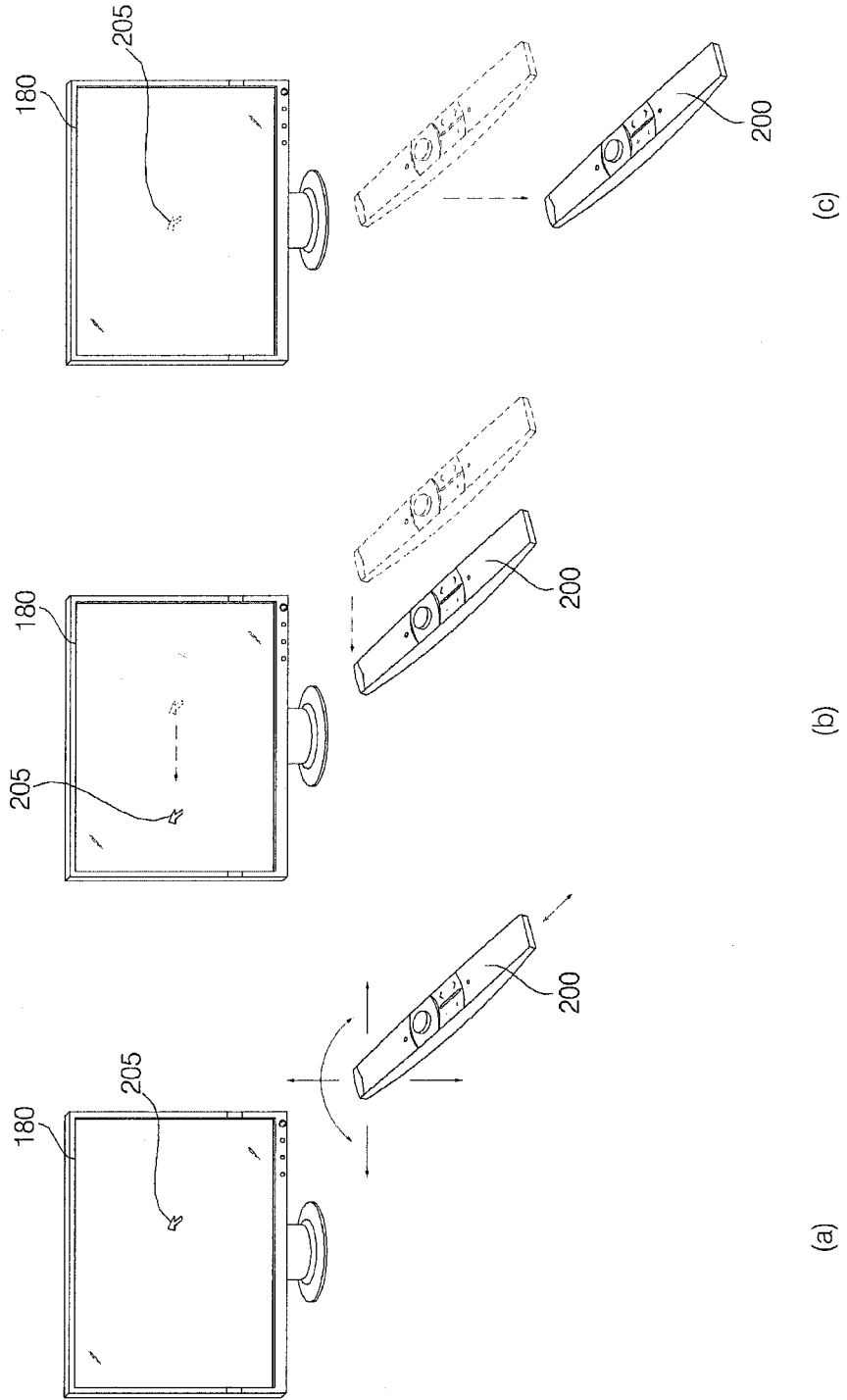
FIG. 13 illustrates a remote controller controlling a pointer displayed on an image display apparatus according to an embodiment of the present disclosure.

FIG. 13 illustrates a method for controlling the image display apparatus using a remote controller according to an embodiment of the present disclosure. Referring to FIG. 13(a), a pointer 205 representing movement of the remote controller 200 may be displayed on the display 180. The remote controller 210 may be a motion sensing remote controller that senses a movement of the remote controller 210. The user may move or rotate the remote controller 200 up and down, side to side (FIG. 13(b)), and back and forth (FIG. 13(c)). Since the pointer 205 moves in accordance with the movement of the remote controller 200, the remote controller 200 may be referred to as a pointing device.

Referring to FIG. 13(b), if the user moves the remote controller 200 to the left, the pointer 205 may move to the left on the display 180 in response thereto. A sensor provided on the remote controller 200 may detect the movement of the remote controller 200 and transmit corresponding motion information to the image display apparatus. Then, the image display apparatus may determine the movement of the remote controller 200 based on the motion information received from the remote controller 200. The controller may then calculate the coordinates of a target location to which the pointer 205 should be shifted in accordance with the movement of the remote controller 200. The image display apparatus may then display the pointer 205 at the calculated coordinates.

Referring to FIG. 13(c), the remote controller 200 may be moved away from the display 180 while a predetermined button on the remote controller 200 is depressed. Then, a selected area corresponding to the pointer 205 may be zoomed in to enlarge a image on the display 180. On the contrary, if the user moves the remote controller 200 toward the display 180, the area corresponding to the pointer 205 may be zoomed out, and thus, reducing the size of the image on the display 180. The opposite may also be possible. That is, when the remote controller 200 moves away from the display 180, the selection area may be zoomed out and when the remote controller 200 approaches the display 180, the selection area may be zoomed in.

With the predetermined button pressed on the remote controller 200, an up, down, left or right movements of the remote controller 200 may be ignored. That is, when the remote controller 200 moves away from or approaches the display 180, only the back and forth movements (e.g., the distance from the display 180) of the remote controller 200 are sensed, while the up, down, left and right movements of the remote controller 200 are ignored. When the predetermined button is not selected at the remote controller 200, the pointer 205 may move in accordance with the up, down, left or right movement of the remote controller 200. Moreover, the speed and direction of the pointer 205 on the display 180 may correspond to the speed and direction of the remote controller 200. The sensitivity of the pointer 205 relative to the movement of the remote controller 200 may be adjusted.

The pointer 205 is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface as well as at a single point on a horizontal and vertical axes.

Figure 14:
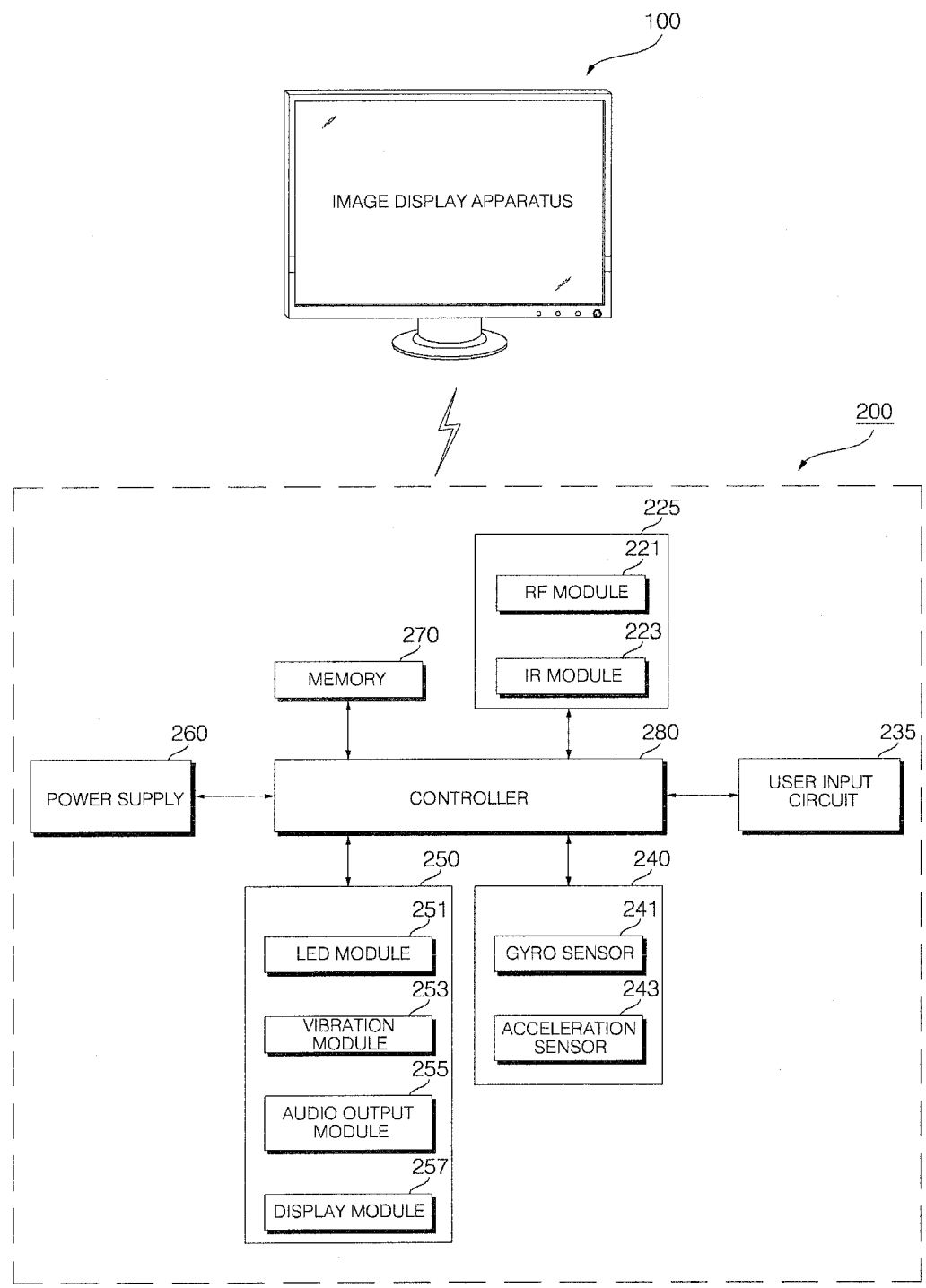
FIG. 14 is a block diagram of a remote controller according to an embodiment of the present disclosure.

FIG. 14 is a block diagram of the remote controller in the image display apparatus according to an embodiment of the present disclosure. Referring to FIG. 14, the remote controller 200 may include a wireless communication module 225, a user input device 235, a sensor 240, an output device 250, a power supply 260, a memory 270, a controller 280, or another appropriate component based on the application or desired functionality of the display device.

The wireless communication module 225 may transmit signals to and/or receives signals from the image display apparatus 100 as disclosed herein. The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

In this embodiment, the remote controller 200 may transmit motion information that represents a movement of the remote controller 200 to the image display apparatus 100 through the RF module 221. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223. In certain embodiments, the command signals may also be transmitted through the RF module 221.

The user input device 235 may include a keypad, a plurality of buttons, a touchpad and/or a touch screen. The user may enter commands to the image display apparatus 100 by manipulating the user input circuit 235. If the user input circuit 235 includes a plurality of hard buttons, the user may input various commands to the image display apparatus 100 by activating the hard buttons. Moreover, if the user input circuit 235 includes a touch screen displaying a plurality of soft keys, the user may input various commands to the image display apparatus 100 by touching the soft keys on the display 180. The user input device 235 may also include various input tools other than those set forth herein, such as a scroll key, a jog wheel, or another appropriate user input device.

The sensor 240 may include a gyro sensor 241 and/or an acceleration sensor 243. The gyro sensor 241 may sense a movement of the remote controller 200, for example, along the X-, Y-, and Z-axis, and the acceleration sensor 243 may sense the acceleration and speed of the remote controller 200. The sensor 240 may further include a distance sensor (proximity sensor) to sense the distance between the remote controller 200 and the display 180.

The output device 250 may output a video and/or audio signal corresponding to manipulation of the user input device 235 or corresponding to a signal received from the image display apparatus 100. The user may easily identify whether the user input device 235 has been manipulated or whether the image display apparatus 100 has been controlled, based on the video and/or audio signal output by the output device 250.

The output device 250 may include a Light Emitting Diode (LED) module 351 which may be activated whenever the user input circuit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the motion sensing remote controller 200 in order to save power. The power supply 260 may again supply power if a predetermined key on the motion sensing remote controller 200 is manipulated.

The memory 270 may store various types of programs and application data necessary to control or drive the remote controller 200. The motion sensing remote controller 200 may wirelessly transmit signals to and/or receive signals from the image display apparatus 100 over a predetermined frequency band with the aid of the RF module 221. The controller 280 of the remote controller 200 may store the frequency band information associated with the paired image display apparatus 100 in the memory 270 for subsequent use.

The controller 280 may provide overall control of the remote controller 200. The controller 280 may transmit a signal corresponding to a key manipulation detected from the user input device 235 or a signal corresponding to a motion of the motion sensing remote controller 200, as sensed by the sensor 240, to the image display apparatus 100.

Figure 15:
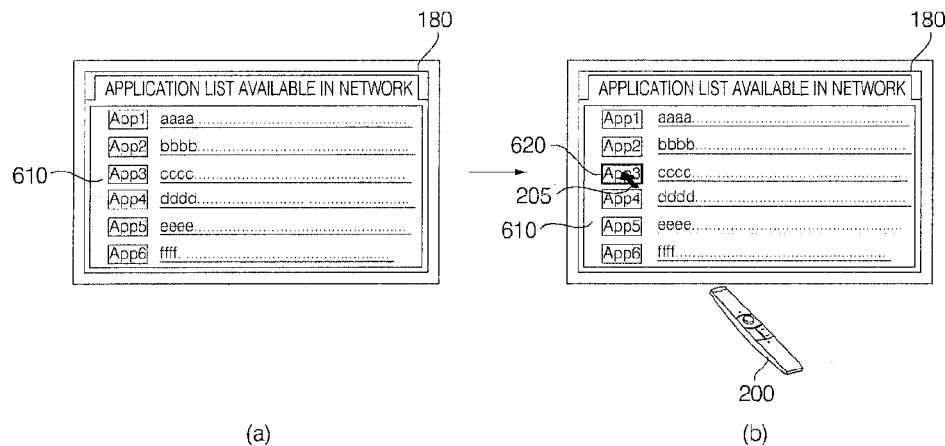
FIGS. 15-18 illustrate various types of a user interface (UI) in an image display apparatus according to embodiments of the present disclosure.

FIGS. 15 to 18 illustrate various types of UIs in an image display apparatus according to embodiments of the present disclosure. Referring to FIG. 15, an application list of applications available over a network may be displayed on the display 180. A user may access a CP or an NP directly, search for various applications, or download the applications from the CP or the NP.

Specifically, FIG. 15(a) illustrates the display 180 which displays an application list 610 of applications which may be available on a server connected to the display apparatus. The application list 610 may include an icon for each application as well as a brief description of the application. Because the image display apparatus as disclosed herein may have full browser functionality, the icons or the descriptions may be enlarged on the display 180 of the image display apparatus. Accordingly, the user may readily identify the desired applications, as described in further detail hereinafter. FIG. 15(b) illustrates a selection of one application 620 from the application list 610 using a pointer 205. The pointer 205 may be controlled by a movement of the remote controller 200. Thus, the selected application 620 may be easily selected, downloaded, or remotely executed over the network.

Figure 16:
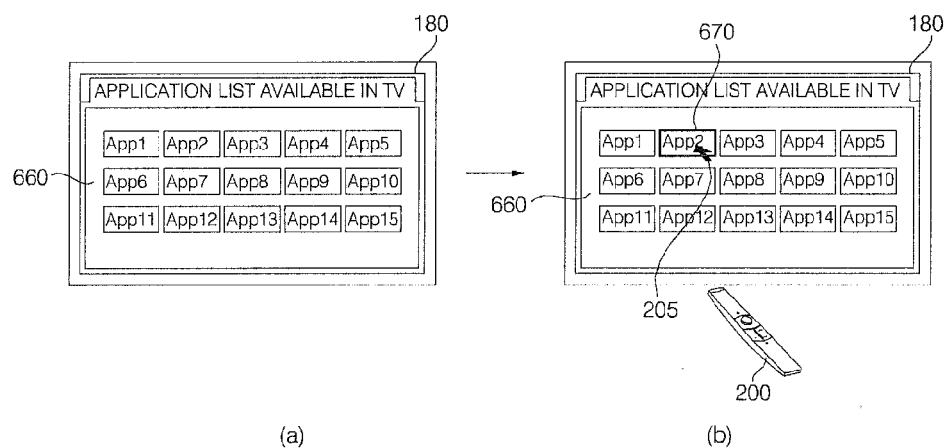

FIG. 16 illustrates an application list displayed on the display 180 according to another embodiment. Referring to FIG. 16(a), when an application list view menu is selected by manipulating the remote controller 200, a list of applications 660 stored in the image display apparatus may be displayed on the display 180. The icons may include identifying information related to the corresponding application to facilitate identification of the application. Moreover, while only icons representing the applications are shown in FIG. 16, the application list 660 may also include brief descriptions of the applications, as in the application list 610 of FIG. 15. Therefore, the user may access additional information to readily identify the applications if desired. FIG. 16(b) illustrates a selection of one application icon 670 from the application list 660 using the pointer 205. The pointer 205 may be controlled by moving the remote controller 200. Accordingly, the selected application 670 may be easily selected and executed.

Moreover, in certain embodiments, the application lists 610 or 660 may display icons representing both applications available over the network as well as applications available locally. In this embodiment, the icons or the descriptions may include additional indicia to differentiate the remote and local applications. For example, the description may include a network address for the corresponding application.

Furthermore, in certain embodiments, the icons may be thumbnails. While icons may include images which are related to the corresponding content (e.g., name or logo of a content server, an image representing a category, etc.), thumbnails may include a representation of the corresponding content (e.g., an image of the content). For example, if the thumbnail corresponds to a still image, a reduced sized version of the still image may be displayed on the thumbnail. Moreover, if the corresponding content is a video image (e.g., a broadcast content), a version of the video image may be played on the thumbnail.

While FIGS. 15 and 16 show that a desired application may be selected by moving the pointer 205 using the remote controller 200, the application may be selected in many other ways. For example, the user may select a specific application by moving a cursor around the display 180 using dedicated keys (e.g., arrow keys and an OK key) on the remote controller 200. In another example, if the remote controller 200 equipped with a touch pad, the pointer 205 may be controlled using the touch pad. Accordingly, the user may select a specific item using the pointer 205 and various types of input devices.

Figure 17:
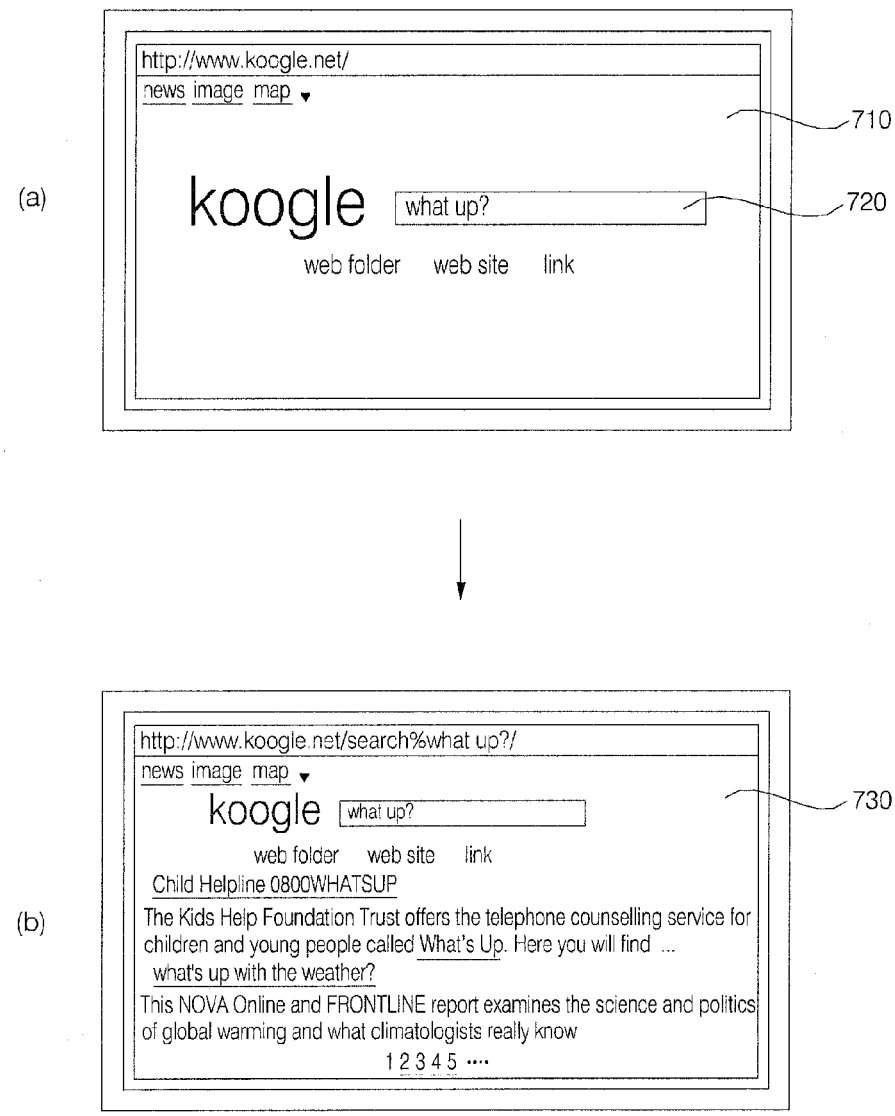

FIG. 17 illustrates a Web page displayed on the display 180. Specifically, FIG. 17(a) illustrates a Web page 710 with a search window 720 displayed on the display 180. A keyword or search string may be input to the search window 720 using a keypad displayed on the display 180, local keys provided on the display apparatus, or character keys provided on the remote controller 200.

FIG. 17(b) illustrates a search result page 730 which may display a search result matching the keyword entered in the search window 720. Since the image display apparatus may have browser functionalities, the user may access a Web page from the search result on the image display apparatus.

Figure 18:
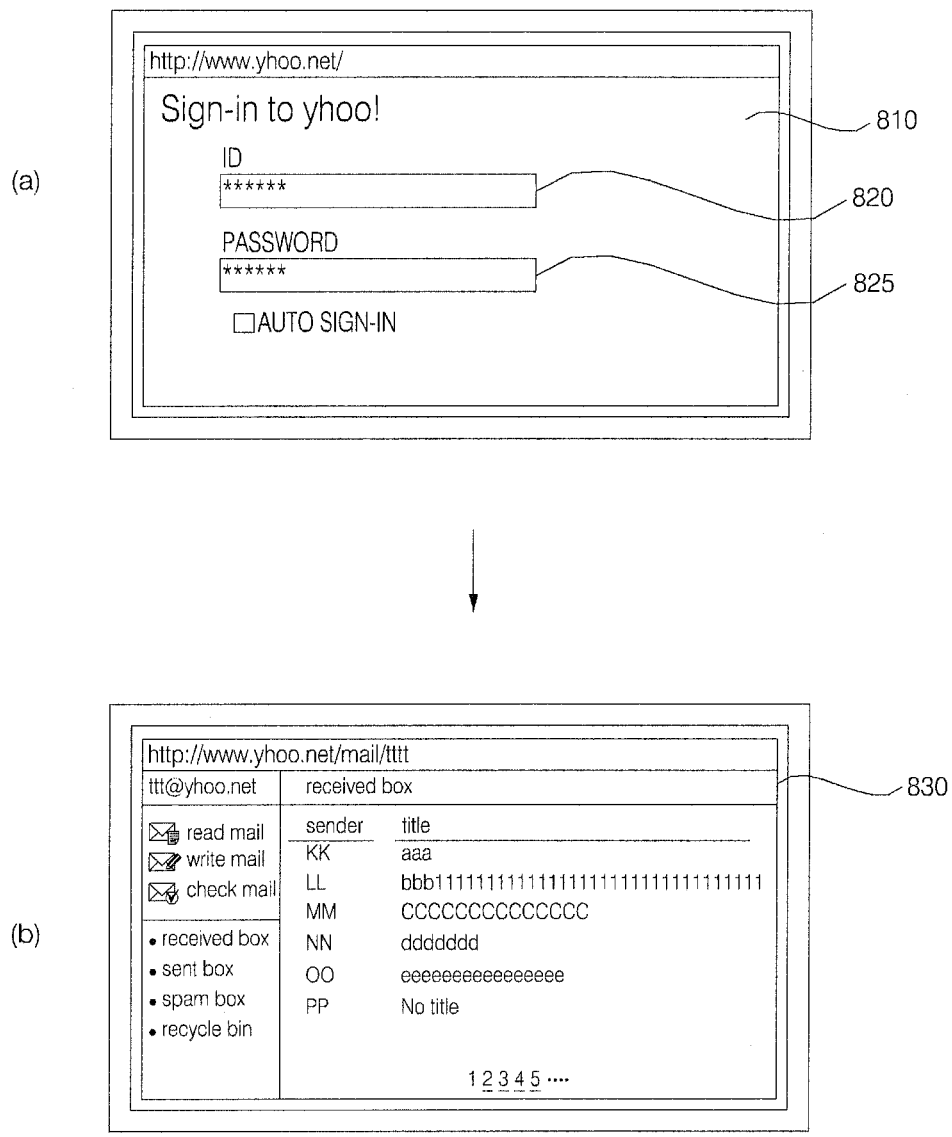

FIG. 18 illustrates another Web page displayed on the display 180. Specifically, FIG. 18(a) illustrates a mail service page 810, including an ID input window 820 and a password input window 825, displayed on the display 180. The user may enter an alphanumeric user ID and password into the ID input window 820 and the password input window 825. The user ID and password may be inputted using a keypad displayed on the mail service page 810, character keys provided as local keys, or character keys provided on the remote controller 200. Hence, the user may login to an online mail service using the image display apparatus.

FIG. 18(b) illustrates a mail page 830 which may be displayed on the display 180 after logging-in to the mail service. The mail page 830 may contains items "read mail," "write mail," "sent box," "received box," "recycle bin," or another appropriate mail related items. Moreover, in the "received box" item, mail may be sorted according to sender or by title. The image display apparatus may be configured to have full browser functionality when displaying the mail service page. Therefore, the user may conveniently access the mail service through the image display apparatus.

Figure 19:
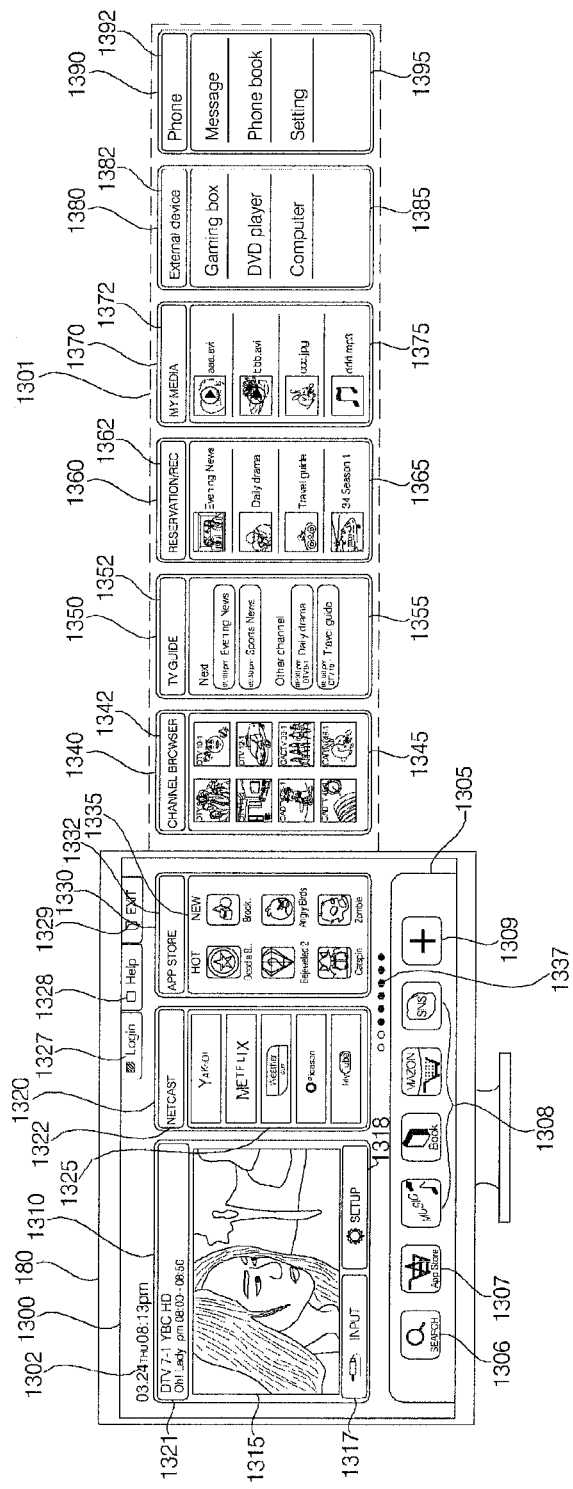
FIG. 19 shows an exemplary home screen displayed on an image display apparatus according to an embodiment of the present disclosure.

FIG. 19 shows an exemplary home screen displayed on the display 180. The configuration of the home screen as shown in FIG. 19 may be a default home screen configuration for a smart TV. The home screen may be set as an initial screen that may be displayed when the image display apparatus 100 is powered on or wakes up from a standby mode. Moreover, the home screen may be a default screen which may be displayed when a local key on the display apparatus 100 or a home key on the remote controller 200 is selected.

Referring to FIG. 19, a card object area may be defined in a home screen 1300. The card object area may include a plurality of card objects 1310, 1320 and 1330 which may be classified based on the source or a type of content. The image display apparatus may include a card object generator which generates and displays the card object. In certain embodiments, the card object generator may be an OSD generator 340 or a functional module included in the controller or another component of the display apparatus 100.

The card object may be a window having a predetermined configuration (e.g., size, shape, color, style, etc.) for display on the display apparatus 100. The configuration of the card objects may be predetermined such that the positioning and arrangement of the card objects on the display may be uniform among the plurality of card objects. For example, each of the card objects be the same size and displayed in areas predefined on the home screen 1300 designated for displaying a card object. In this manner, the arrangement of the home screen 1300 may be maintained while the displayed content on the home screen 1300 may be updated or changed.

Referring again to FIG. 19, the card object 1310 may be named BROADCAST and may display a broadcast image. The card object 1320 may be named NETCAST and may provide a list of CPs, e.g., a list of CPs available through NetCast. The card object 1330, which may be named APP STORE, may provide a list of applications.

Other card objects may be arranged in a hidden area 1301. The card objects in the hidden area 1301 may be hidden from view on the display 180. These hidden card objects may be shifted or scrolled onto the display 180 to replace the displayed card objects. The hidden card objects, as shown in FIG. 19, may include a CHANNEL BROWSER card object 1340 which may provide a thumbnail list of broadcast channels, a TV GUIDE card object 1350 which may provide a program list, a RESERVATION/REC card object 1360 which may provide a reserved or recorded program list, a MY MEDIA card object 1370 which may provide a list of multimedia files which are available on the image display apparatus 100 or on a device connected to the image display apparatus 100, an EXTERNAL DEVICE card object 1380 which may provide a list of external devices which may be connected to the image display apparatus 100, and a PHONE card object 1390 which may provide a list of call-related items.

The BROADCAST card object 1310 may display a broadcast image 1315 received through the tuner 110 or the network interface 130, an information object 1321 that displays information about the broadcast image 1315, a device object 1317 representing an external device, and a setup object 1318. Moreover, the BROADCAST card object 1310 may be fixed in size by a lock function such that the broadcast image 1315 may be viewed while the other displayed card objects 1320, 1330 may be scrolled.

Moreover, the broadcast image 1315 may be scaled or resized. For instance, a size of the broadcast image 1315 may be enlarged or reduced by dragging the broadcast image 1315 with the pointer 205 of the remote controller 200. As the broadcast image 1315 is scaled up or down, the number of the displayed card objects may be changed accordingly. For example, the number of card objects displayed on the display 180 may be changed from three to either four or two card objects. Furthermore, when the broadcast image 1315 in the card object 1310 is selected, the broadcast image 1315 may be displayed as a full screen image on the display 180.

The information object 1321 that displays information related to the broadcast image 1315 may include a channel number (DTV7-1), a channel name (YBC HD), the title of a broadcast program ("Oh! Lady"), and an airtime (8:00-8:50 PM) for the broadcast program. Therefore, the user may readily obtain information regarding the displayed broadcast image 1315 through the information object 1321. Moreover, if the user selects the information object 1321, related EPG information may be displayed on the display 180.

A current time object 1302 that includes a date (03.24), a day (THU), and a current time (8:13 PM) may be displayed above the card object 1310. Thus, the user may readily identify current time information through the current time object 1302. The device object 1317 may represent an external device connected to the image display apparatus 100. For example, if the object 1317 is selected, a list of external devices connected to the image display apparatus 100 may be displayed. The setup object 1318 may be used to set various settings of the image display apparatus 100, such as video settings, audio settings, screen settings, reservation settings, setting of the pointer 205 of the remote controller 200, network settings, or another appropriate setting for the image display apparatus 100.

The card object 1320 may contain a card object name 1322 (NETCAST) and a CP list 1325 that displays a list of CPs. While Yakoo, Metflix, weather.com, Picason, and MyTube are listed as available CPs in the CP list 1325, as shown in FIG. 19, it should be appreciated that many other CPs may be listed in the CP list 1325. Upon selection of the card object name 1322, the card object 1320 may be displayed as a full screen image on the display 180. The same may apply to the other card objects 1330, 1340, 1350, 1360, 1370, 1380, 1390. Moreover, if a specific CP is selected from the CP list 1325, a list of content available from the selected CP may be displayed on the display 180.

The card object 1330 may include a card object name 1332 (APP STORE) and an application list 1335. The application list 1335 may display a plurality of icons representing applications available on a server, for example, for download or purchase from the display apparatus 100. Application icons may be sorted into predetermined categories in the application list 1335. As shown in FIG. 19, applications may be sorted by popularity (HOT), by time (NEW), and/or another appropriate category group. Upon selection of an application icon from the application list 1335, information related to the selected application may be displayed on the display 180.

A Login menu item 1327, a Help menu item 1328, and an Exit menu item 1329 may be displayed above the card objects 1320 and 1330. The user may login to the APP STORE or a network connected to the image display apparatus 100 using the Login menu item 1327. The Help menu item 1328 may provide guidance regarding operation of the image display apparatus 100. The Exit menu item 1329 may be used to exit the home screen 1300. When the Exit menu item 1329 is selected, a full screen image of the received broadcast image may be displayed on the display 180.

An indicator object 1337 may be displayed under the card objects 1320 and 1330 to indicate the total number of available card objects. The indicator object 1337 may also indicate the number of card objects which are displayed on the display 180. For example, the total number of dots may represent the total number of available card objects. The displayed card objects may be represented by corresponding highlighted dots which may be differentiated by a different color (e.g., white). Moreover, the position of the highlighted dots among the plurality of dots may correspond to a position of the displayed card objects among the plurality of available card objects. As shown in FIG. 19, the first two white dots of the eight total dots may represent the first two card objects (NETCAST and APP STORE card objects) among the eight available card objects, in their relative positions.

The card object 1340 may represent a list of broadcast channels. This card object 1340 may include a card object name 1342 (CHANNEL BROWSER) and a thumbnail list of broadcast channels 1345. A plurality of broadcast channels may be represented as thumbnail images, as shown in FIG. 19. The thumbnail images may include still images or moving pictures. The thumbnail list 1345 may include information related to the channels as well as the thumbnail images for the channels such that the broadcast programs of the channels may be readily identified.

Moreover, the thumbnail images may correspond to pre-stored user channels (e.g., favorite list) or to channel numbers relative to the channel being displayed in the card object 1310 (e.g., channels which are numbered higher or lower than the displayed channel). Although eight channel thumbnail images are displayed in FIG. 9, many other configurations may be possible. The arrangement and selection of the displayed thumbnail images may be updated in the thumbnail list 1345. Upon selection of a thumbnail image from the thumbnail list 1345, a broadcast program from the selected channel may be displayed on the display 180.

The card object 1350 which represents a program list may contain a card object name 1352 (TV GUIDE) and a program list 1355. The program list 1355 may list broadcast programs for the currently displayed channel or broadcast programs for one or more different channels. If a program is selected from the program list 1355, a broadcast image of the selected program (e.g., currently being broadcast) or broadcasting information related to the selected program (e.g., future broadcasts) may be displayed on the display 180.

The card object 1360 which represents a reserved (e.g., a scheduled recording) or recorded program list may include a card object name 1362 (RESERVATION/REC) and a scheduled or recorded program list 1365. The scheduled or recorded program list 1365 may include scheduled recordings or scheduled programs which have been recorded. Moreover, while a thumbnail image is displayed for each program as shown in FIG. 19, the present disclosure is not limited thereto and the program listing may be displayed in various formats. For example, the scheduled/recorded program list 1365 may include a text listing, a grid, thumbnail images only, or another appropriate format to list the scheduled recordings/recorded programs. Upon selection of a scheduled recording or a recorded program from the scheduled or recorded program list 1365, broadcast information related to the scheduled recording or the recorded broadcast program may be displayed on the display 180. Alternatively, if recorded, the recorded program may be displayed on the display 180.

The card object 1370 display a list of multimedia files and may include a card object name 1372 (MY MEDIA) and a media list 1375. The media list 1375 may list multimedia files available on the image display apparatus 100 or a device connected to the image display apparatus 100. While the multimedia files are shown as moving pictures, still images, and audio in FIG. 19, many other types of media (e.g., text, e-books, etc.) may be listed in the card object 1370. Upon selection of a file from the media list 1375, the selected file may be opened and a window (e.g., audio/video player or picture viewer window) that corresponds to the selected file may be displayed on the display 180.

The card object 1380 may display a list of connected external devices and may contain a card object name 1382 (EXTERNAL DEVICE) and a device list 1385 of external devices connected to the image display apparatus 100. The external device list 1385 may include a gaming box, a DVD player, a computer, or another appropriate device. Upon selection of the card object name 1382, the card object 1380 may be displayed as a full screen image on the display 180. Moreover, upon selection of a specific external device from the external device list 1385, a menu related to the selected external device may be displayed. For example, content may be played back from the external device and a window (e.g., device control menu window) that corresponds to the reproduced content may be displayed on the display 180.

The card object 1390 may display call-related information and may include a card object name 1392 (PHONE) and a call-related list 1395. The call-related list 1395 may be a listing related to calls placed or received from a portable phone, a computer, or the image display apparatus 100 capable of placing calls. For instance, the call-related list 1395 may include a message item, a phone book item, or a setting item. Upon receipt of an incoming call at the portable phone, the computer, or the image display apparatus 100, the call-related card object 1390 may be automatically displayed in the card object area of the display 180. If the card object 1390 is already displayed on the display 180, it may be highlighted or otherwise distinguished from the other card objects.

Therefore, the user may readily identify incoming calls received on a nearby portable phone, a computer, or the image display apparatus 100. This is an interactive function among the portable phone, the computer, and the image display apparatus, and may be referred to as a 3-screen function. Moreover, upon selection of the card object name 1392, the card object 1390 may be displayed as a full screen image on the display 180. Upon selection of a specific item from the call-related list 1395, a window that corresponds to the selected item may be displayed on the display 180.

The controller or the card object generator may store and manage (e.g., sort and arrange a display order of the card objects), and display the card objects. The controller or the card object generator may set a virtual hidden area on one side of the screen so as to manage a sort and display order of the card objects. The controller or the card object generator may also control scrolling of the card objects, for example, to shift a displayed card objects to be hidden and to shift a hidden card object to be displayed on the display apparatus 100.

As shown in FIG. 19, the card objects 1310, 1320 and 1330 may be displayed in the card object area 1300, and the card objects 1340 to 1390 may be hidden in the hidden area 1301, by way of example. The card objects 1320 and 1330 displayed on the display 180 may be exchanged with the hidden card objects 1340 to 1390 according to a card object shift input. For example, at least one of the card objects 1320 and 1330 being displayed on the display 180 may be moved to the hidden area 1301 and in turn, at least one of the hidden objects 1340 to 1390 may be displayed on the display 180.

An application menu 1305 may include a plurality of application menu items. The plurality of application menu items may include predetermined menu items 1306 to 1309 which may be selected from all application menu items available on the display 180. Thus, the application menu 1305 may be referred to as an application compact-view menu. The application menu items 1306 to 1309 may be divided into mandatory application menu items 1306, 1307, and 1309 (Search, App Store, and '+') and optional application menu items 1308 (e.g., Music, Book, MAZON, and SNS).

The mandatory application menu items 1306, 1307 and 1309 may be fixed such that the user is not allowed to edit these items. The Search application menu item 1306 may provide a search function based on an input search keyword. The App Store application menu item 1307 may allows direct to access an AppStore. The '+' (View More) application menu item 1309 may provide a full screen function wherein the application menu 1305 may be displayed as a full screen image.

In certain embodiments, an Internet application menu item and a mail application menu item may be added as mandatory application menu items in the application menu 1305. The user-set application menu items 1308 may be changed to display applications menu items for applications which are frequently accessed. It should be appreciated that, while the application menu 1305 is disclosed herein as having a predetermined specific set of mandatory application menu items and user-set application menu items, the present disclosure is not limited thereto, and any number or types of application menu items may be designated as being mandatory or optional.

Figure 20:
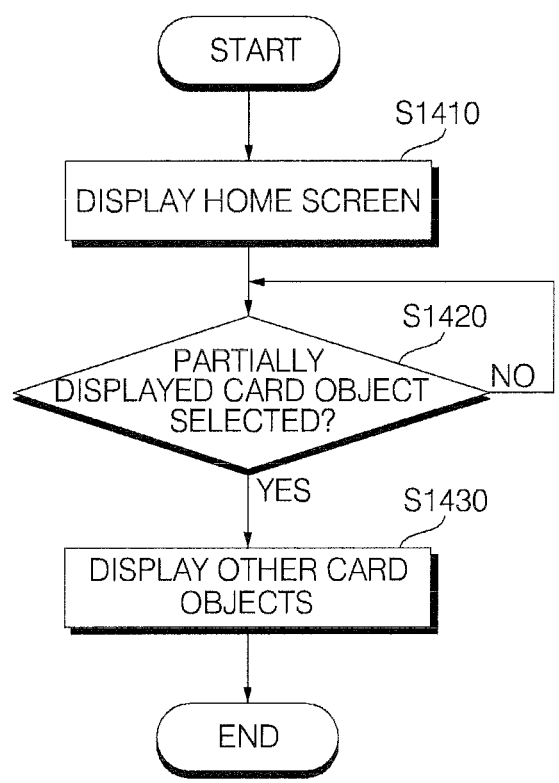
FIG. 20 is a flowchart of a method for operating an image display apparatus according to an embodiment of the present disclosure.
Figure 21:
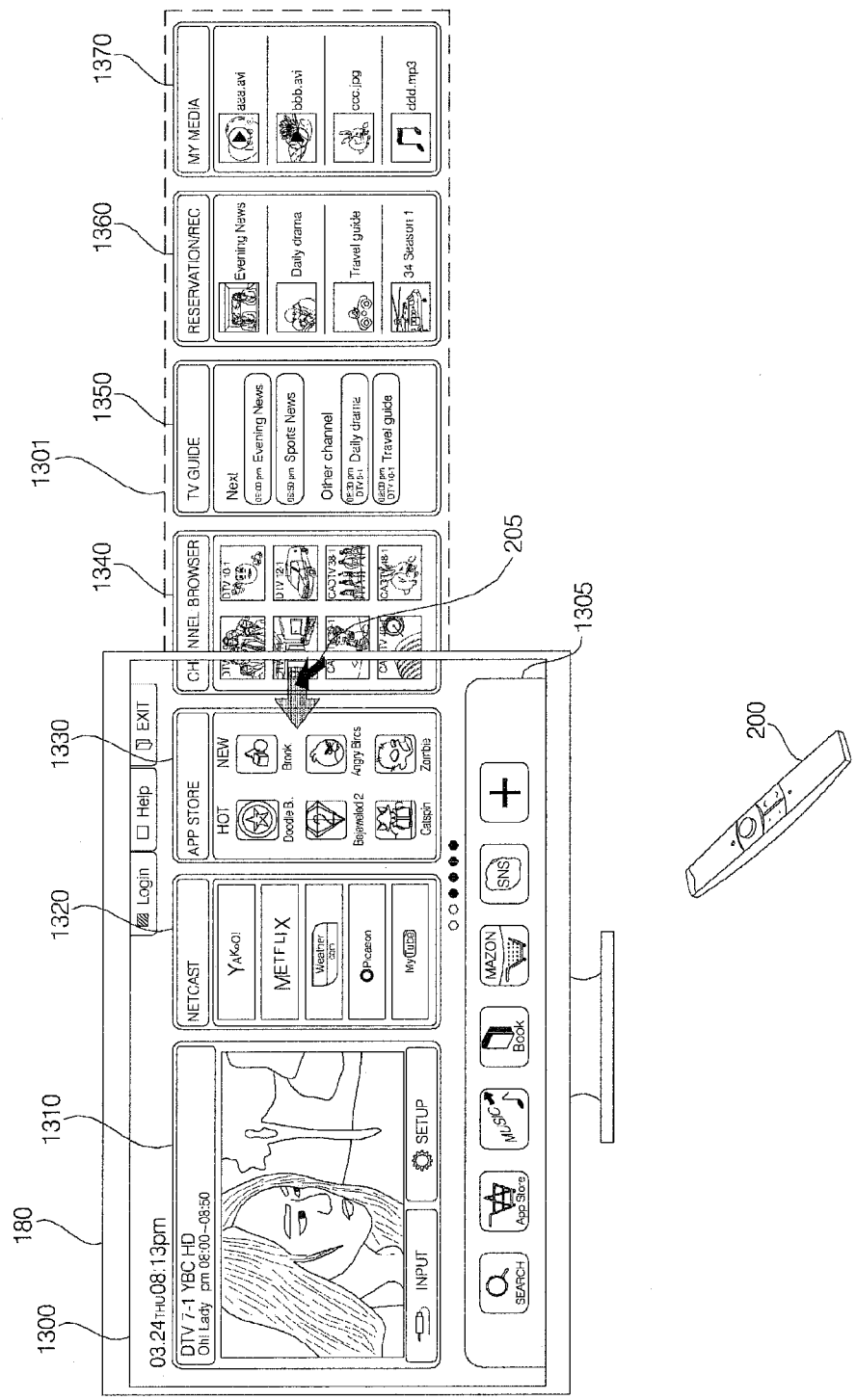
FIGS. 21, 22 and 23 show home screens to illustrate the method of FIG. 20.
Figure 22:
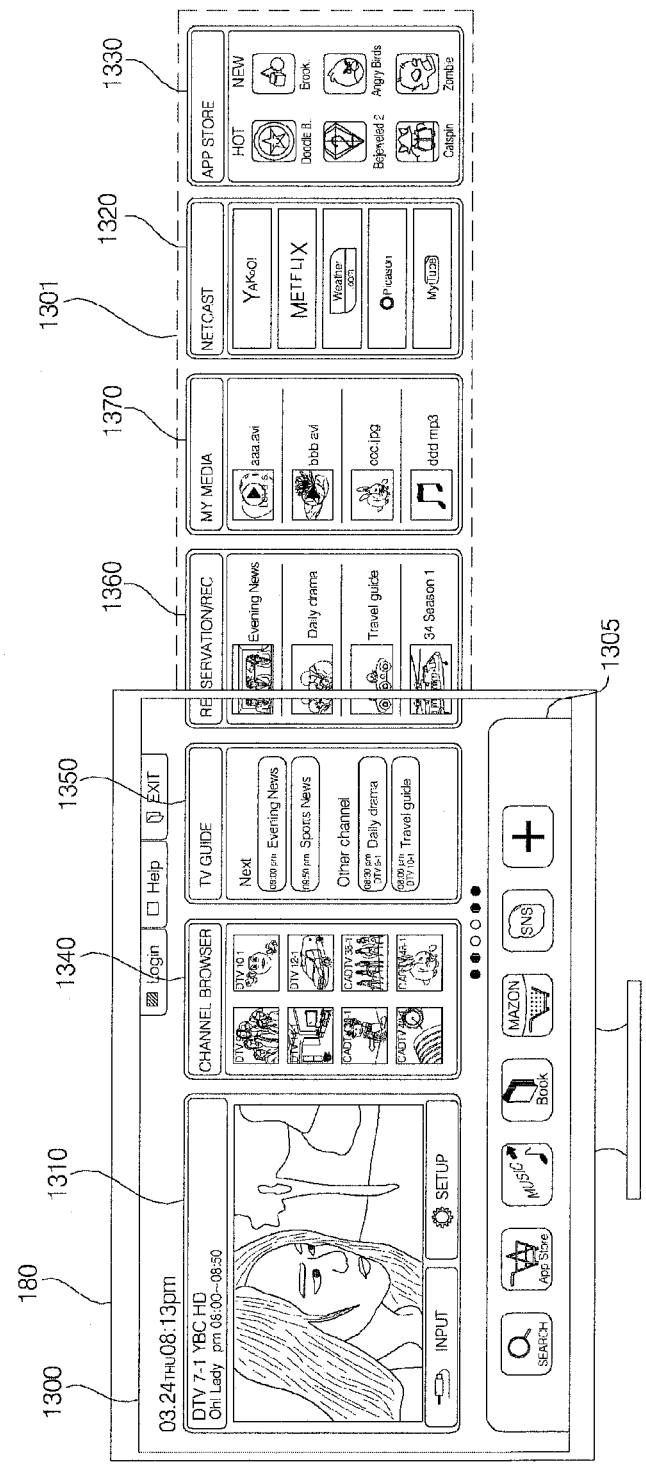
Figure 23:
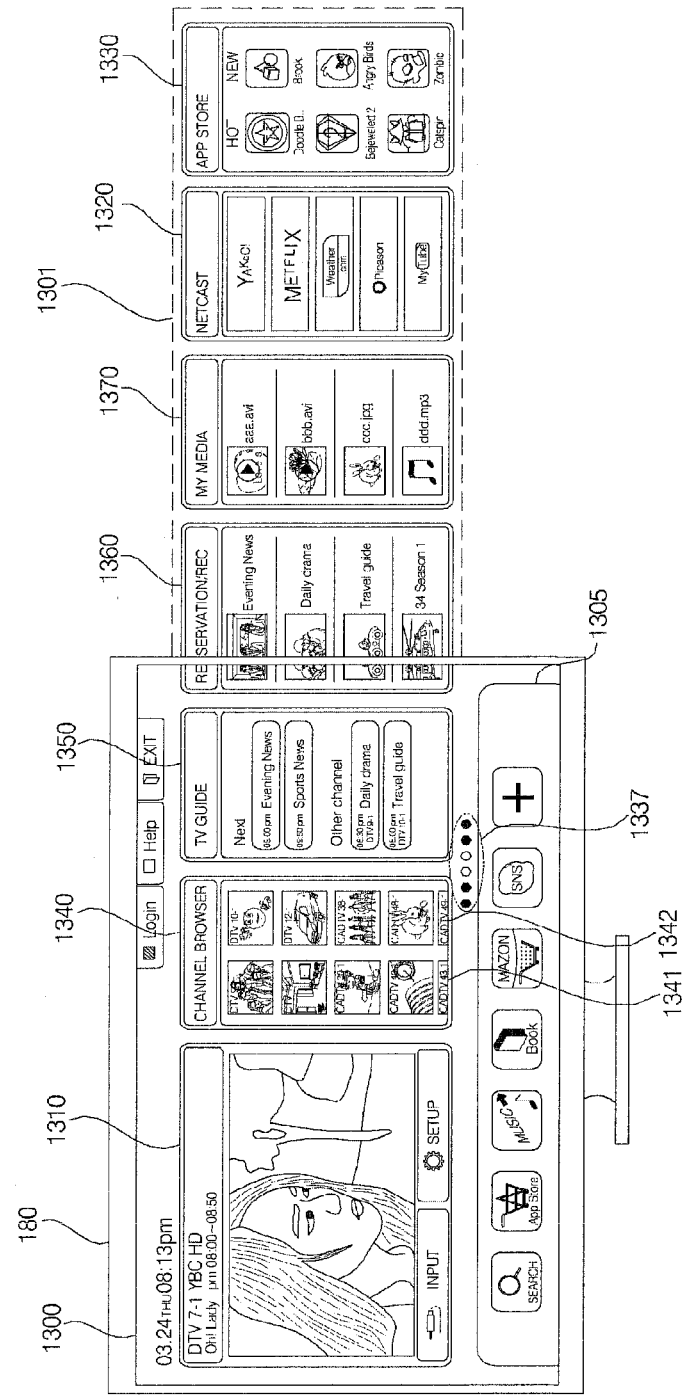

FIG. 20 is a flowchart of a method for operating an image display apparatus according to an embodiment of the present disclosure, and FIGS. 21, 22 and 23 are exemplary home screens to illustrate the method of FIG. 20. Referring to FIG. 20, the method for operating an image display apparatus according to an embodiment of the present disclosure, may include displaying the home screen 1300, in step S1410. The home screen 1300 may include a plurality of card objects, for example, a BROADCAST card object 1310, a NETCAST card object 1320, the APP STORE card object 1330, and the application menu 1305 that includes at least one application menu item displayed on the display 180, as illustrated in FIG. 21.

The home screen 1300 may be displayed, in step S1410, when the image display apparatus is powered on, wakes up from standby mode, or receives a go-to-home input. Since the home screen 1300 was previously described with reference to FIG. 19, a detailed description of the home screen 1300 is not repeated hereinbelow.

As described with reference to FIG. 19, the plurality of card objects may include at least one of a card object that provides a thumbnail list of broadcast channels, a card object that provides a scheduled program list or a recorded program list, or a card object that provides a list of multimedia files available on the image display apparatus or in a device connected to the image display apparatus. Among the card objects, a card object that displays a broadcast image may include a received broadcast image and an object representing information related to the broadcast image.

The plurality of card objects may include the CHANNEL BROWSER card object 1340. This card object may be partially displayed on the display 180. Herein, a partially displayed card object such as the CHANNEL BROWSER card object 1340 is referred to as a first card object. That is, referring to FIG. 21, the card objects 1320 and 1330 are fully displayed, while the card object 1340 is partially displayed on the display 180.

Upon selection of the first card object 1340, in step S1420, the first card object 1340 may be fully displayed, as illustrated in FIG. 22. For example, at least one of the card objects displayed on the display 180 (1320, 1330) may be moved to the hidden area 1301 and at least one of card objects hidden in the hidden area 1301 (1340, 1350) may in turn be displayed on the display 180, in step S1430.

A card object may be selected through manipulation of input device such as the pointer 205 which may be controlled by a movement of the remote controller 200, a local key of the image display apparatus, a directional key on the remote controller, etc. Moreover, the number of card objects displayed on the home screen 1300 may be variable.

Specifically, upon selection of the first card object 1340, the partially displayed first card object 1340 (CHANNEL BROWSER) representing a thumbnail list of broadcast channels and the TV GUIDE card object 1350 that displays a program list may be moved out of the hidden area 1301 to replace the NETCAST card object 1320 and the APP STORE card object 1330 in the card object area. Thus, the CHANNEL BROWSER card object 1340 may be fully displayed.

As the CHANNEL BROWSER card object 1340 and the TV Guide card object 1350 are displayed on the home screen 1300, the RESERVATION/REC card object 1360 may now be partially displayed as a first card object, as shown in FIG. 22. Among the displayed card objects, the first card object 1360 of FIG. 22 may be placed at the rightmost position. In other words, the first card object 1360 may now be the leftmost card object in the hidden area 1301.

In certain embodiments, a selection of the partially displayed first card object may result in replacing only one displayed card object with a new card object, rather than replacing all displayed card objects with new hidden card objects. For example, referring to FIG. 21, a selection of the partially displayed CHANNEL BROWSER card object 1340 may result in sliding this card object to an area on the display occupied by the APP STORE card object 1330, and sliding the NETCAST card object 1320 off the screen to the hidden area.

Moreover, the NETCAST card object 1320, which was replaced by the CHANNEL BROWSER card object 1340, may be partially displayed at the left side of the APP STORE card object 1330 to indicate presence of available card objects. In this case, the partially displayed card object on the left side may be displayed between the BROADCAST card object and the leftmost card object. In other words, hidden card objects may be partially displayed on the left side as well as the right side of the displayed card objects to indicate presence of additional card objects on each respective side.

The partially displayed card objects may be further distinguished from the active card objects by distinguishing a color, tint, brightness, shading, fading, or another appropriate characteristic to further distinguish the partially displayed card objects. For example, the image of the partially displayed card objects may be faded such that the partially displayed card objects are less noticeable. Other graphic effects may be provided, such as gradually fading the partially displayed card object towards the edge of the display, to further distinguish these card objects while minimizing their potential distraction to a user.

FIGS. 21 and 22 illustrate examples of a home screen 1300 which may include a partially displayed object at the right side of the display that indicates presence of an additional card object on the right side of the display. When additional information is present in the vertical direction, a similar environment may be provided to display the additional card objects.

Moreover, similar methods may be used to identify hidden objects (e.g., icons) within a card object. For example, the CHANNEL BROWSER card object 1340 as shown in FIG. 23 may include additional hidden objects 1341 and 1342 which may be partially displayed on the bottom of the card object 1340. Accordingly, the user may readily recognize the presence of additional hidden thumbnail images 1341, 1342 and view them by scrolling up the CHANNEL BROWSER card object 1340 using the remote controller 200. Alternatively, the partially displayed object 1341 or 1342 may be selected to fully display the partially displayed object 1341 or 1342 as well as other hidden thumbnails without manually scrolling to view the hidden thumbnails.

For example, when the partially displayed object 1341 or 1342 is selected (e.g., using the remote controller 200), all displayed thumbnails may be replaced with new thumbnails (e.g., hidden thumbnails). Here, a selection of the partially displayed objects 1341 or 1342 may be similar to a selection of a page up/down button. In certain embodiments, the selection of the partially displayed object 1341 or 1342 may cause the thumbnails to shift by one row. Here, the partially displayed objects 1341 or 1342 may be used similar to a scroll button. Moreover, when changing the displayed thumbnails, the displayed thumbnails may be scrolled to slide across the display or may be changed instantly without the graphic effects.

Indicator objects 1337 in this embodiment may also indicate which of the plurality of card objects are currently being displayed on the home screen 1300. For example, in FIG. 23, six card objects 1320-1370 may be available (excluding the BROADCAST card object 1310). The six card objects may be represented by six corresponding dots of the indicator object 1337 positioned below the two displayed card objects 1340, 1350. The six dots of the indicator object 1337 may be displayed according to a relative order of the available card objects such that a relative position of the displayed card objects may be determined based on the dots.

For example, the first dot may corresponds to the first card object (NETCAST 1320) and may be displayed at a far left position among the six dots. The third dot may correspond to the third card object (CHANNEL BROWSER 1340) and may be displayed at the third position from the left among the six dots, etc. Because the dots which correspond to the displayed card objects (CHANNEL BROWSER card object 1340 and the TV GUIDE card object 1350) may be highlighted (white dots), a relative position of the displayed card objects among the all available card objects may be determined through the indicator objects 1337 (e.g., CHANNEL BROWSER card object 1340 is the third card object).

Figure 24:
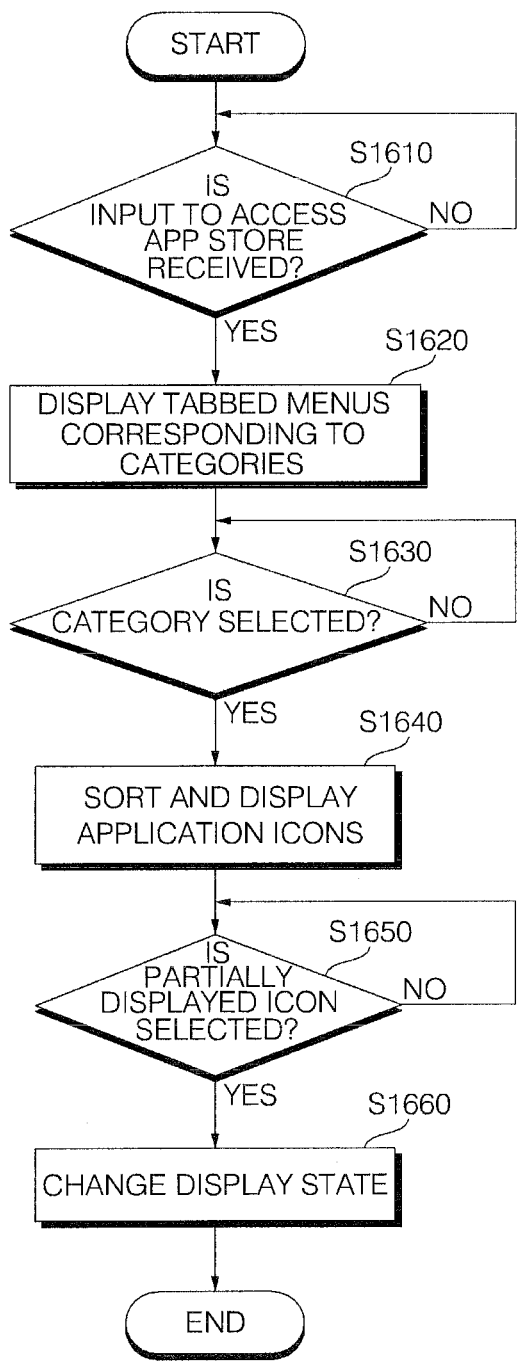
FIG. 24 is a flowchart of a method for operating an image display apparatus according to another embodiment of the present disclosure.

FIG. 24 is a flowchart of a method for operating an image display apparatus according to another embodiment of the present disclosure, and FIGS. 25 to 32 are exemplary screen images to illustrate the method of FIG. 24. Particularly, FIGS. 25 to 32 illustrate exemplary application market screens, for example, app store screens.

Referring to FIG. 24, the method for operating an image display apparatus according to this embodiment may include receiving a go-to-app store input, in step S1610, in response to the go-to-app store input, displaying tabbed menus which may represent categories in which a plurality of applications may be classified in a first area of the display 180, in step S1620, and upon a selection of a tabbed menu corresponding to a category, in step S1630, sorting icons that represent applications in the selected category according to sub-categories and displaying the sorted icons based on the sub-categories, in step S1640.

Figure 25:
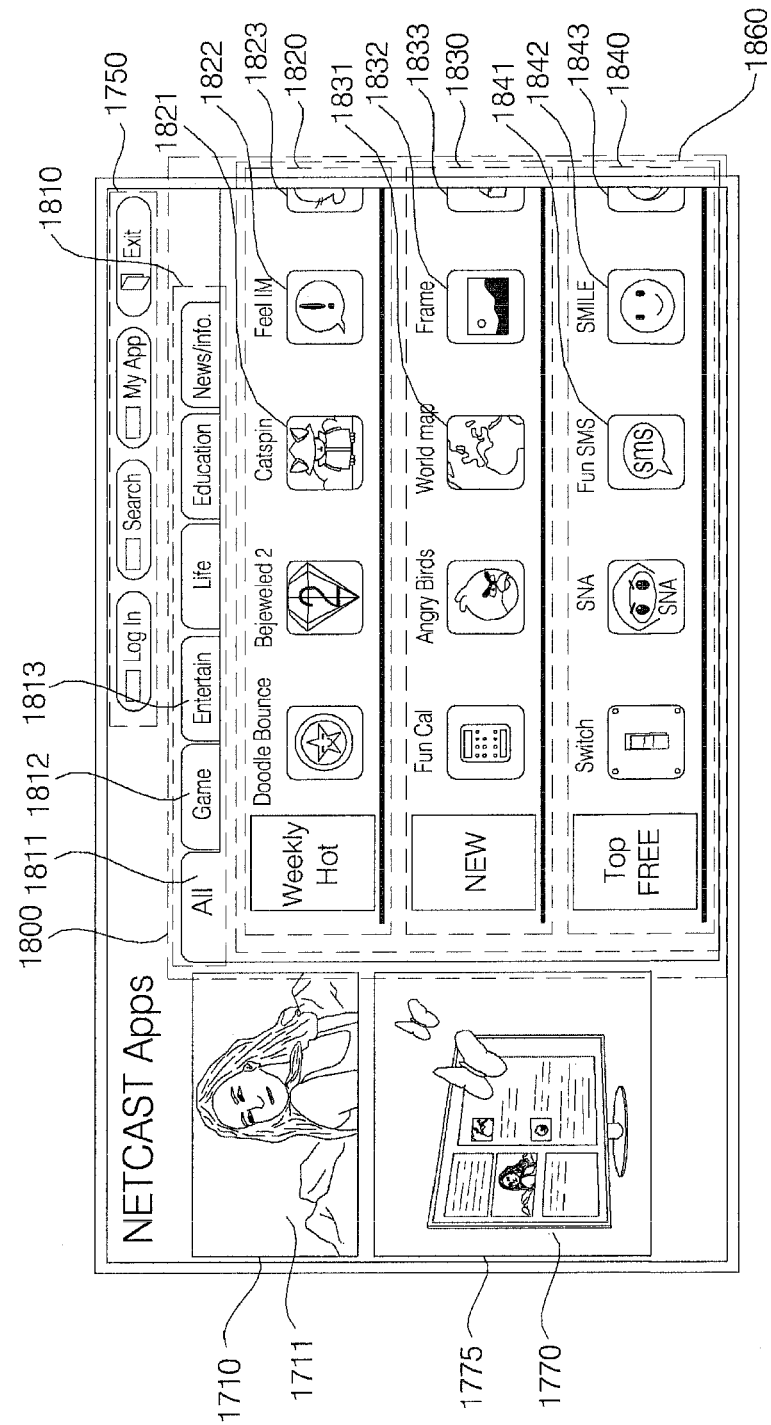
FIGS. 25 to 32 show views of the image display apparatus to illustrate the method of FIG. 24.

Referring to FIG. 25, tabbed menus which may represent categories into which a plurality of applications are classified may be displayed in a first area 1800 of the display 180. The large number of available application may make identification of newly added applications difficult. Accordingly, the applications may be classified into various categories (e.g., game, news, sport, etc.) based on the type of application, as illustrated in FIG. 25, a user may search for a desired application more easily.

In step S1620 as shown in FIG. 24, the method for operating an image display apparatus may further include displaying a broadcast image 1711 in a second area 1710 of the display 180. Thus, the broadcast image 1711 may be continually displayed while accessing the app store. Upon selection of a tabbed menu corresponding to a category, application icons that fall into the selected category may be sorted according to sub-categories and displayed in at least a part of the display 180, preferably in the first area 1800. That is, because the applications of the selected category are re-classified and displayed according to predetermined criteria, the user can identify the applications more easily.

FIG. 25 illustrates an example in which a category 1811 'ALL' with all applications is selected. The selected category 1811 may be displayed differently from other categories 1812 and 1813 in color, size, etc. One of the tabbed menus may be selected based on pre-stored settings or by a user input. For example, the category 1811 'All' may be set by default. In this case, when an app store (application market) is accessed, the application icons included in the category 'All' may be automatically sorted and displayed according to predetermined criteria, as illustrated in FIG. 25. Accordingly, when the tabbed menus are displayed, the category 'All' may be selected by default according to an embodiment of the present disclosure.

The sub-categories may be based, for example, on a total popularity ranking 1820 (Weekly Hot), new application 1830 (New), free application ranking 1840 (Top FREE), or paid application ranking, for a predetermined time period. The predetermined time period may be, for example, a day, a week, a month, a quarter, a half year, a year, or a custom time period, and may be set to be different for each sub-category. For instance, a top ranking list which may list the download or installation rankings of applications may be ranked and displayed on a weekly basis, whereas the numbers of downloads or installations of free or paid applications may be accumulated for an indefinite period and tabulated as a top free application list or a top paid application list. A new application list including new applications released within a predetermined time may also be made based on a different statistical period from those of other sub-categories.

The application lists of the sub-categories may contain fully displayed icons and partially displayed icons. Referring to FIG. 25, the Weekly Hot list 1820 may contain full icons 1821 and 1822 and a partial icon 1823. The New list 1830 may also contain full icons 1831 and 1832 and a partial icon 1833. The Top FREE list 1840 may contain full icons 1841 and 1842 and a partial icon 1843.

Simply for ease of discussion, the partially displayed icons may be referred to as first icons. The user may readily recognize the presence of additional icons hidden from the display 180 based on these first icons. Upon selection of a first icon, in step S1650, the display state of the first area may be changed, in step S1660. In step S1660, the first icon may be fully displayed. In an embodiment, hidden icons may be displayed along with the selected first icon in the application list containing the first icon.

Figure 26:
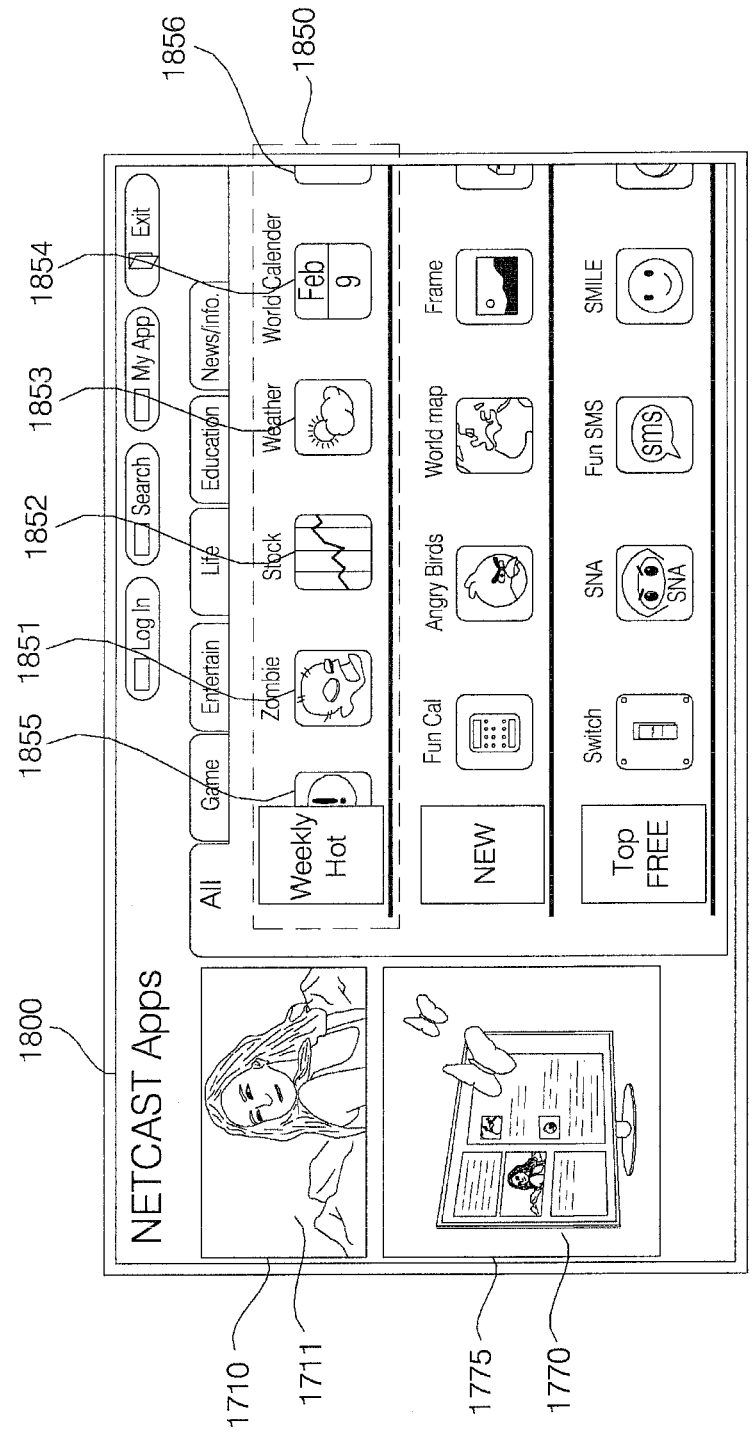

Upon selection of the first icon 1823 which is partially displayed in the Weekly Hot list 1820 in FIG. 25, the Weekly Hot list 1820 may be changed to display an icon 1851 which may be a fully displayed version of the first icon 1823, followed by icons 1852, 1853 and 1854 which were hidden, as shown in FIG. 26. In this manner, the first icon 1823 may function to shift the application list forward or backward so that the application list displays previous or next icons which were not previously displayed.

The first icon 1851 (full version of partially displayed first icon 1823) may be placed at the leftmost position of the application list. Moreover, if there are remaining hidden icons, not yet displayed in the Weekly Hot list 1820, an icon 1856 may be partially displayed at the rightmost position, as shown in FIG. 26, in order to indicate to the user of the existence of additional information.

Upon selection of the first icon 1823 in FIG. 25, the fully displayed icon 1822 to the left of the first icon 1823 may be partially displayed as illustrated in FIG. 26 (shown in FIG. 26 as icon 1855). In this case, the user may readily recognize that there is a previous icon which may be available in the Weekly Hot list 1820. When the user clicks on the first icon 1822, the Weekly Hot list 1820 may be shifted to display the previous icons.

In certain embodiments, when first icon 1823 as shown in FIG. 25 is selected, the displayed icons in the Weekly Hotlist 1820 may be shifted (e.g., scrolled) by one icon to display the first icon 1823 at a location where icon 1822 was originally displayed. In this case, only the left most icon may be scrolled off the screen to be hidden or partially displayed, while the other three previously displayed icons may still be displayed.

Meanwhile, a specific image, for example, an advertisement 1775 may be displayed in a third area 1770 of the display 180. The advertisement 1775 may be received from a network or a connected external device. If a signal related to an advertisement is not received, any other image may be displayed. For instance, an advertisement for a manufacturer of the image display apparatus, which may be stored in the image display apparatus, may be displayed in the third area 1770.

In addition, when the user selects or focuses on a specific application, an image that corresponds to the application may be displayed in the third area 1770. If the user selects an icon, an image displayed on the third area 1770 may be replaced with information about the application corresponding to the selected icon. Moreover, when another icon is selected, or if a hidden first icon is selected, the displayed images in the corresponding list (Weekly Hot list 1820, New list 1830, or Top Free list 1840) as well as the third area 1770 may be updated accordingly.

Figure 27:
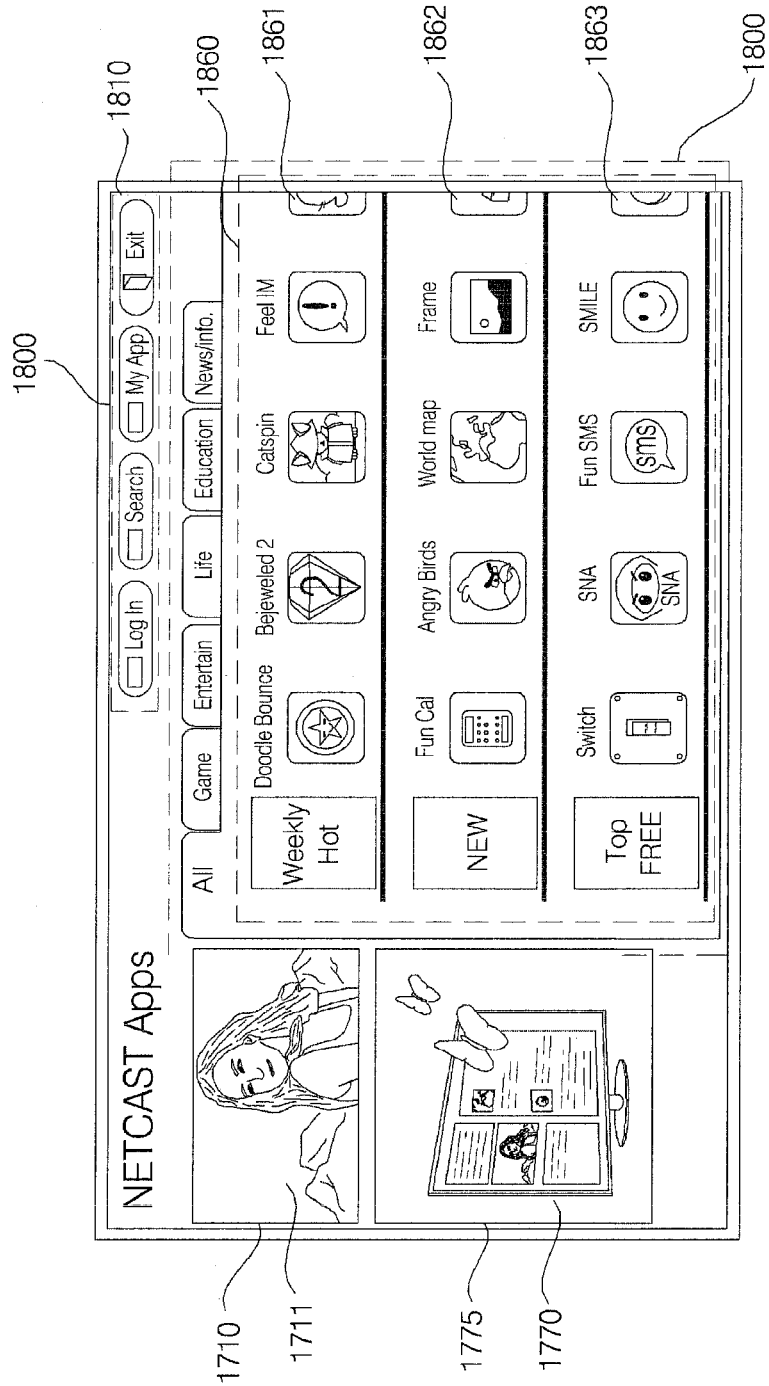
Figure 28:
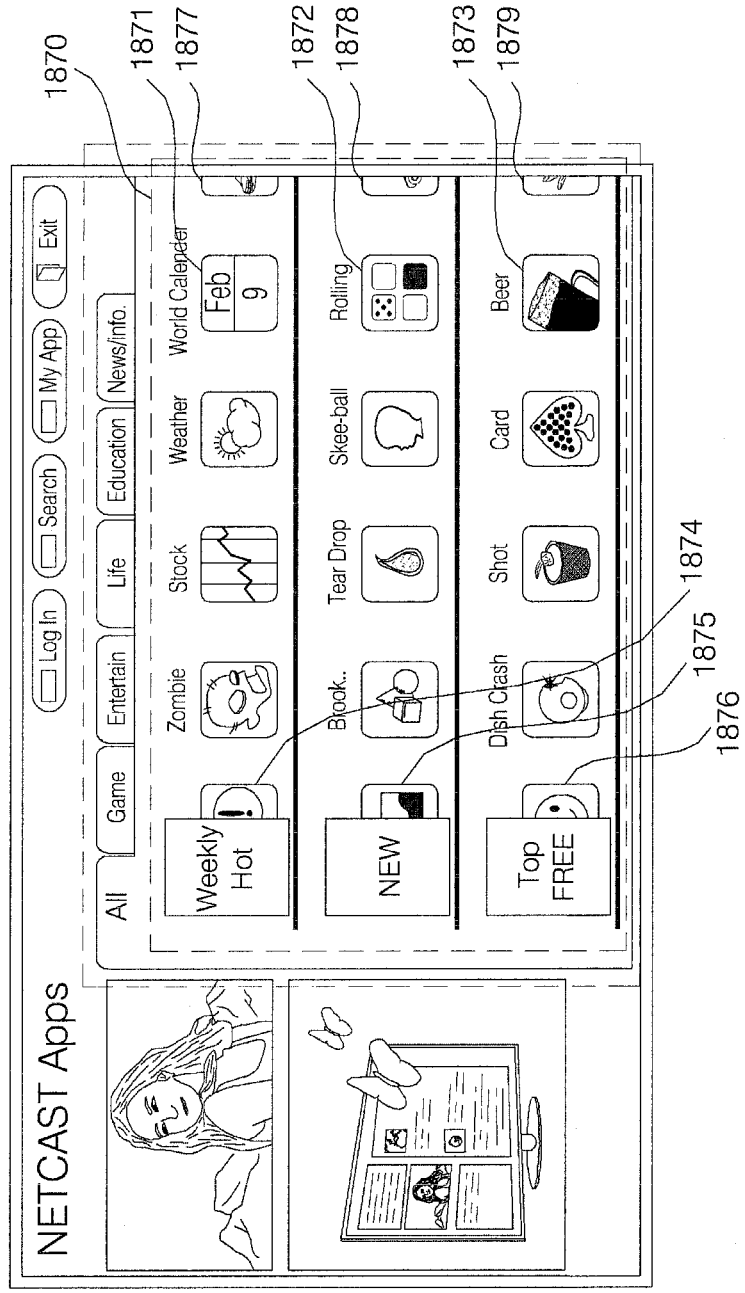

According to an embodiment of the present disclosure, upon selection of the first icon, the current screen may turn to a previous page or a next page in step S1660. FIGS. 27 and 28 are exemplary screen images to illustrate a change in a display screen upon a selection of a partially displayed icon (i.e. a first icon) according to this embodiment. Here, when one of a partially displayed first icon 1861, 1862, or 1863 is selected when under the category "All," a current page 1860 may be switched to a next page 1870.

Referring to FIG. 28, each of application lists on the page 1870 may include a plurality of icons. Among them, icons 1871, 1872 and 1873 may be fully displayed, whereas first icons 1874 to 1879 may be partially displayed. The first icons 1874 to 1879 may be placed at the leftmost or rightmost positions in their respective application lists.

The user may recognize the presence of the previous page when the first icons 1874, 1875 and 1876 are displayed at the leftmost positions in their respective application lists. Upon selection of the first icon 1874, 1875 or 1876, the current screen may turn to the previous page 1860 of FIG. 27. Likewise, a presence the first icons 1877, 1878 and 1879 at the rightmost positions in their respective application lists may indicate a presence of a next page. Upon selection of one of the first icons 1877, 1878 or 1879, the current screen 1870 may turn to a next page that includes the full version of the first icons 1877, 1878, 1879 as well as additional hidden icons if available.

Figure 29:
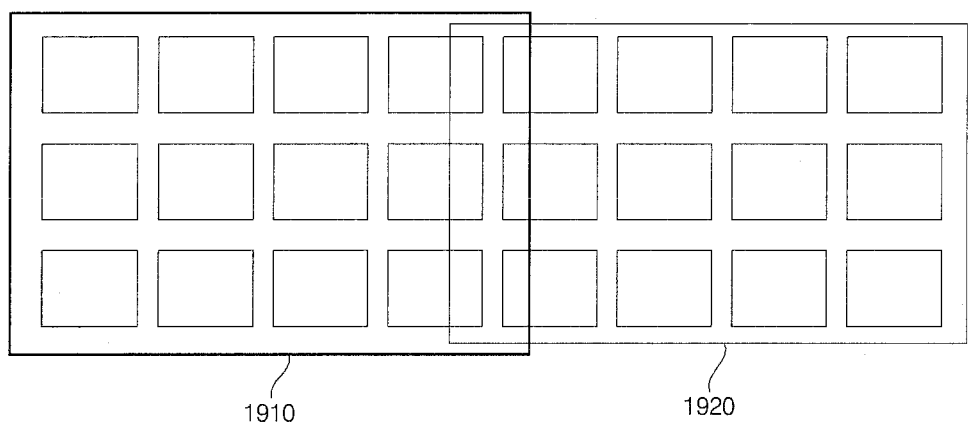
Figure 30:
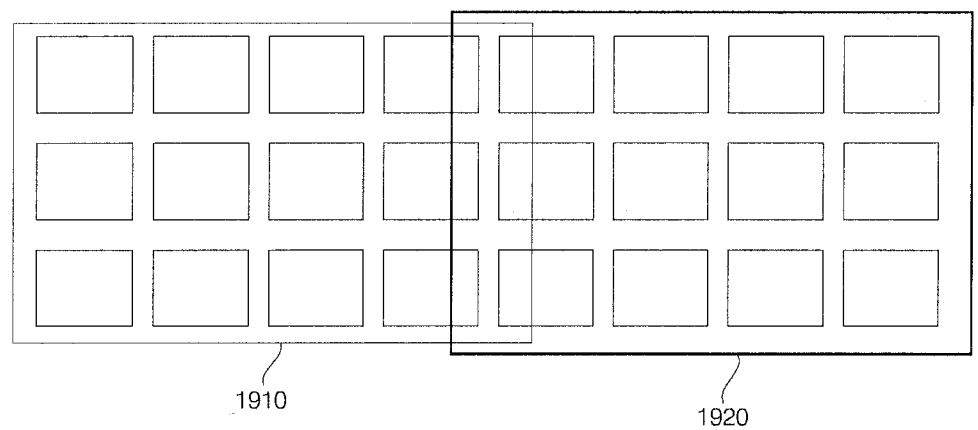

FIGS. 29 and 30 illustrate displayed screen image switching according to an embodiment of the present disclosure. Here, a displayed image screen may be switched based on flicking when two pages are available. In FIGS. 29 and 30, two large rectangles 1910, 1920 may represent pages, wherein the bolded rectangle may represent a current page.

Referring to FIG. 29, a first page 1910 may be displayed on a display screen. Unlike a conventional page, the first page 1910 may contain a portion of the next page 1920 to notify the user of the presence of the next page 1920. Here, the first page 1910 may easily be turned to the next page 1920 through flicking. Referring to FIG. 30, the second page 1920 may be displayed. Like the first page 1920, the second page 1920 may contain a portion of the first page 1920. The second page 1920 may be easily flicked to the previous page 1910.

A flicking or a flick input may be, for example, a touch input similar to a touch-and-drag input. However, in this type of input, the movement to drag is a quick movement across the screen. Unlike the touch-and-drag input where the drag may span across the screen, the flicking motion may require a quicker motion that spans a smaller distance. The flick input may be generated through a touch screen input, a remote controller 200, or another appropriate input device.

Figure 31:
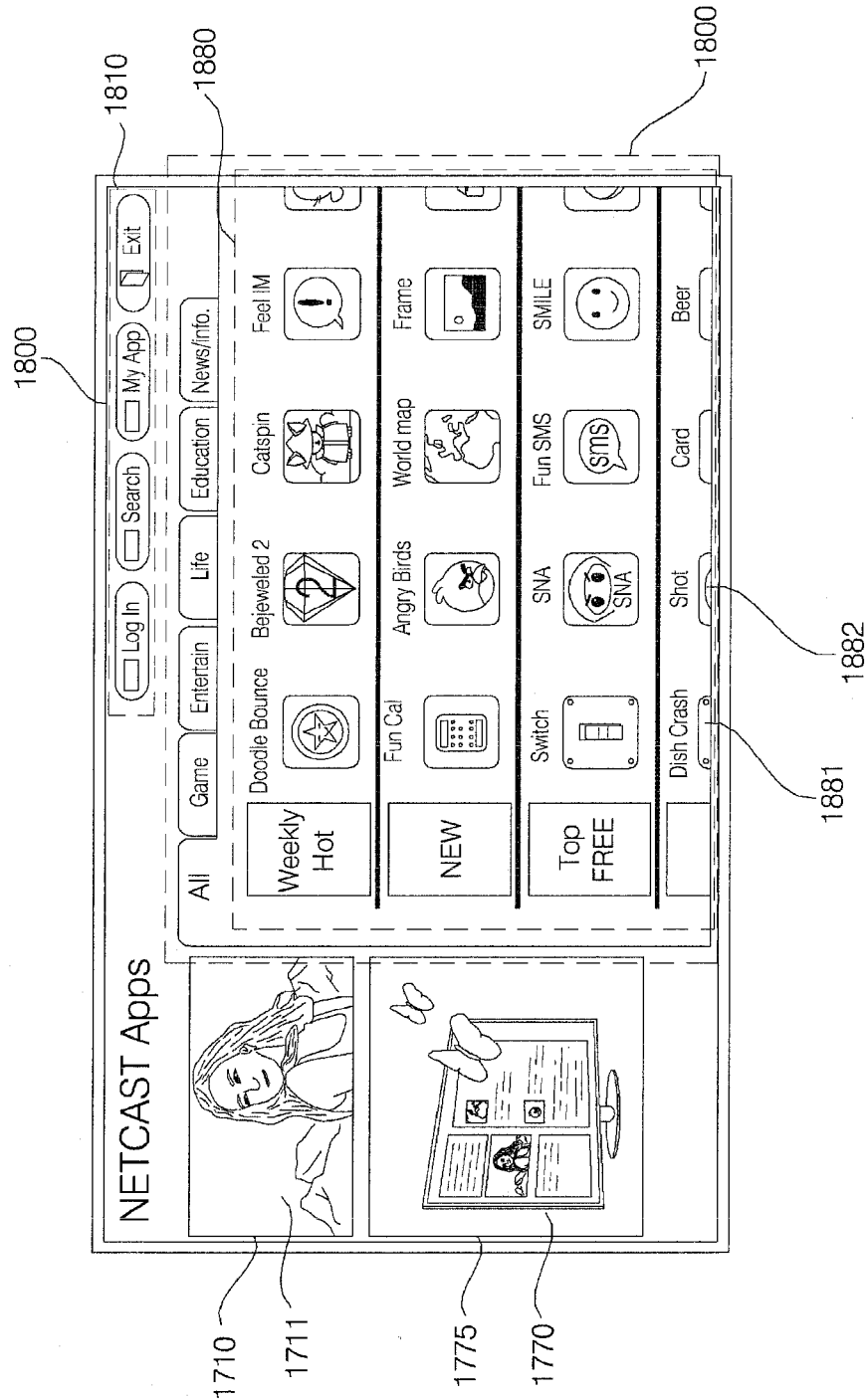
Figure 32:
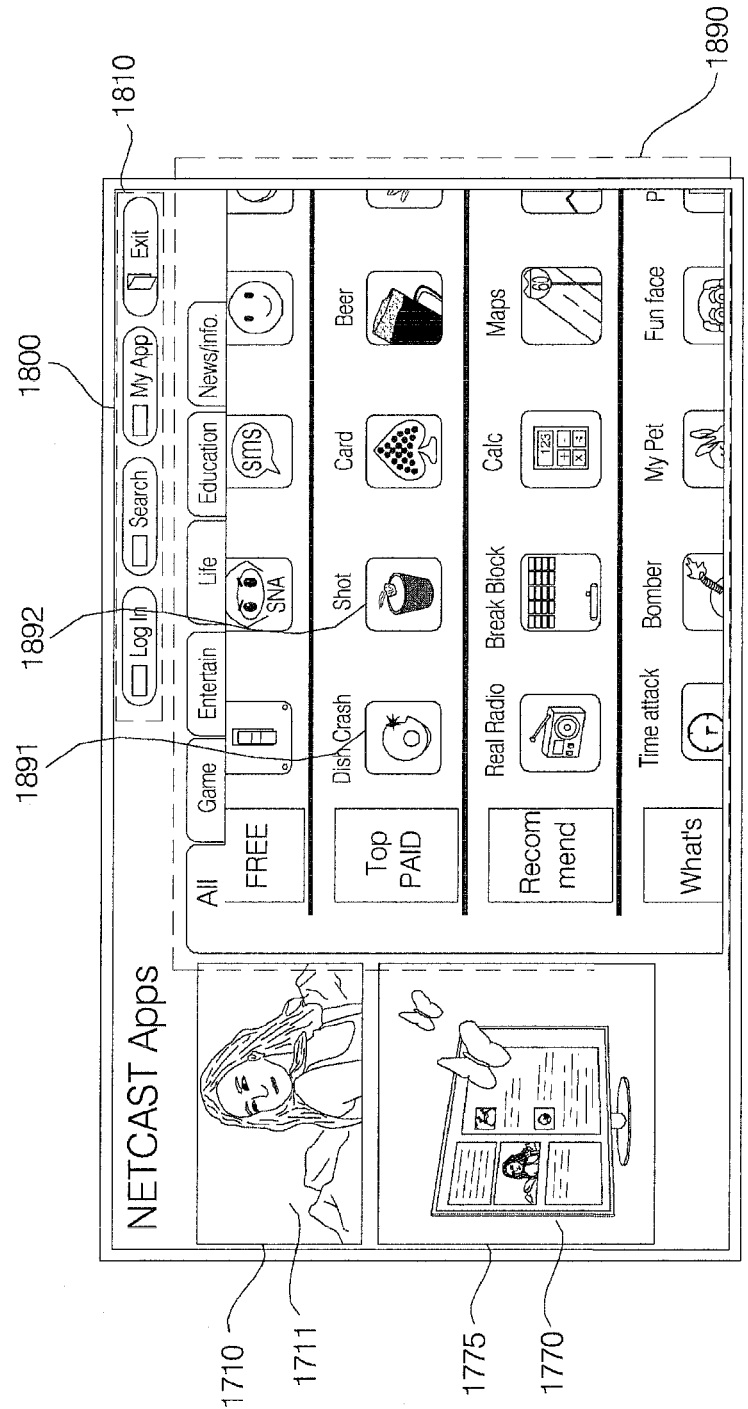

FIGS. 31 and 32 are exemplary display screen images of an application list that includes partially displayed icons (i.e. first icons) 1881 and 1882 positioned vertically, under fully displayed icons. That is, while the first icons, as illustrated in FIGS. 25 to 30, were positioned horizontally at the leftmost or rightmost portions of the display, first icons 1881 and 1882 in this embodiment may be partially displayed at the bottom to indicate that there is still another page. Upon selection of the icon 1881 or 1882, the next page may be displayed.

That is, if there are additional hidden application lists or icons available vertically at either the top or bottom of the display, an partial first icon 1881, 1882 may be partially displayed on the top or bottom edge of the display area to indicate the presence of the additional information. Upon selection of the partially displayed icon 1881 or 1882, as shown in FIG. 31, the selected icon 1881 or 1882 may be fully displayed as an icon 1891 or 1892, as illustrated in FIG. 32. Along with the full icons 1891 and 1892, other hidden application lists such as a Top PAID list, a Recommended list, etc. may be displayed to replace the Weekly Hot list, the New list, and the Top FREE list of FIG. 31. Moreover, as shown in FIG. 32, additional partially displayed icons may be displayed on the top and bottom of the application list area to indicate the presence of additional information, if available (e.g., Time Attack).

Figure 33:
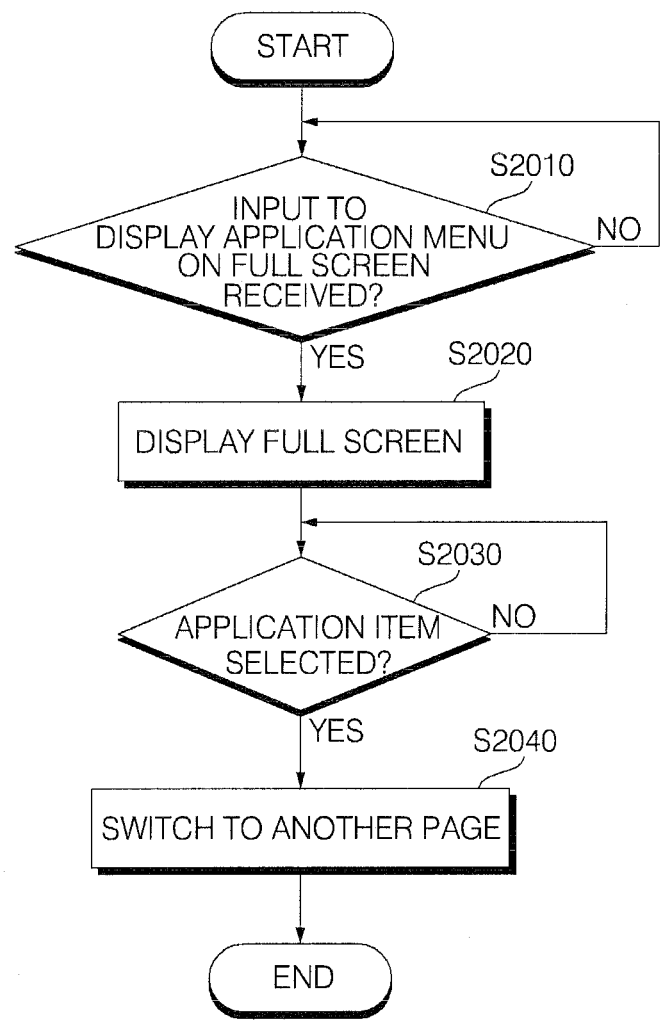
FIG. 33 is a flowchart of a method for operating an image display apparatus according to another embodiment of the present disclosure.
Figure 35:
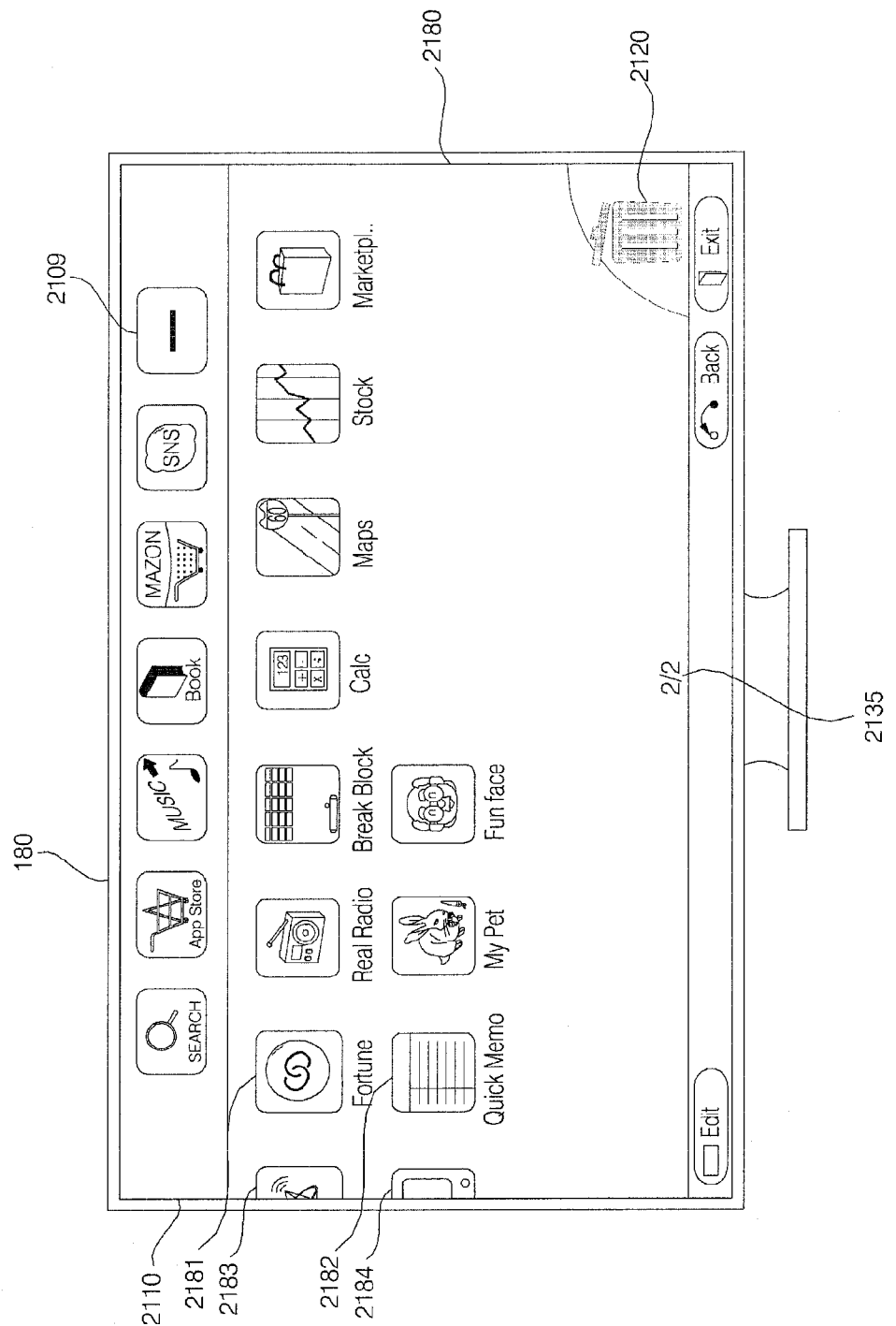
Figure 36:
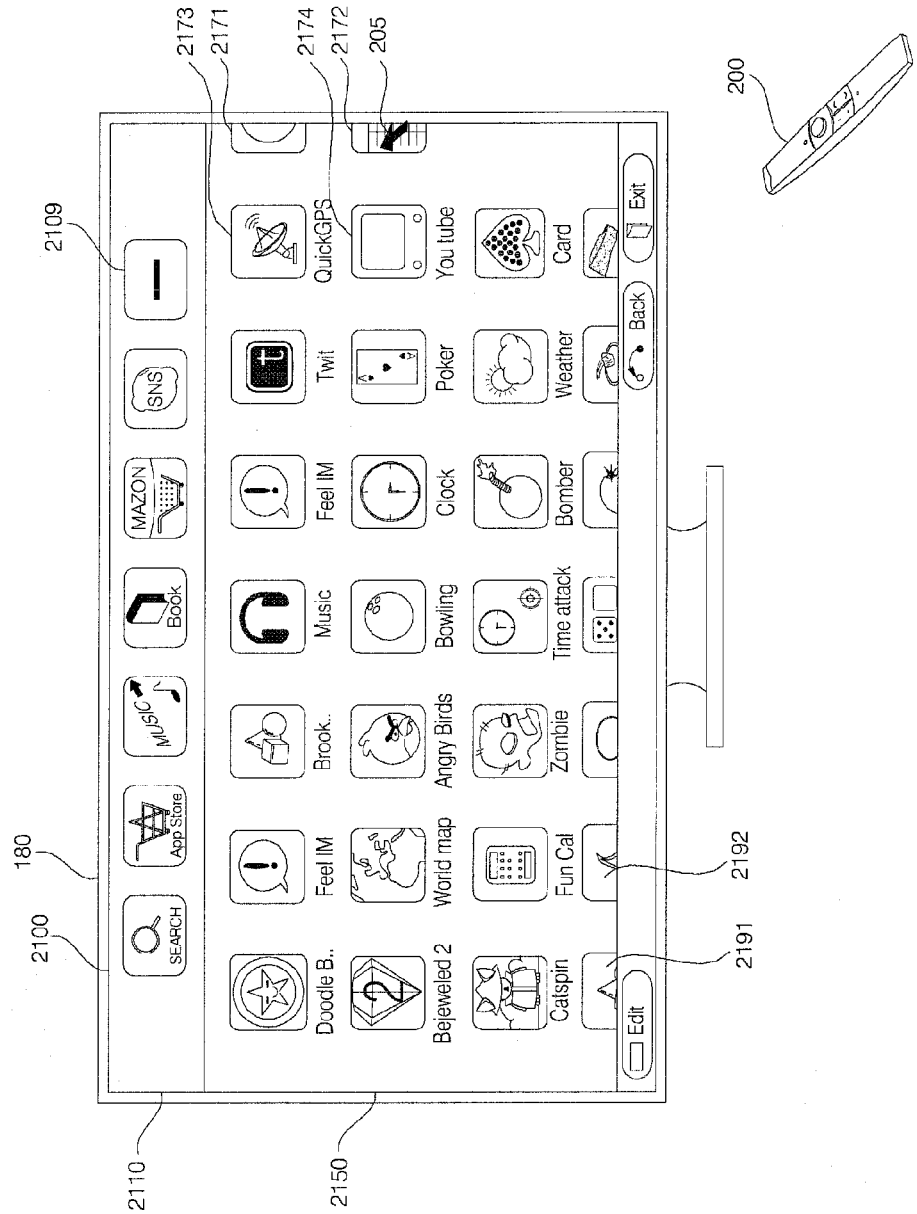

As previously discussed, a broadcast image may be displayed on a portion of the display 180. FIG. 33 is a flowchart of a method for operating an image display apparatus according to another embodiment of the present disclosure, and FIGS. 34, 35 and 36 are exemplary display screen images to illustrate the method of FIG. 33.

Referring to FIG. 33, an input to display the application menu on a full screen may be received, in step S2010. The input to switch to a full screen view of the applications may be generated in various manners. For example, a full screen function may be invoked by selecting the view more (+) application menu item 1309 in the application menu 1305 of FIG. 19 using the pointer 205. The pointer 205 may be controlled by a movement of the remote controller 200. Moreover, the view more (+) application menu item 1309 may be selected through a selection of a directional key or both a directional key and an "OK" key on the remote controller 200.

Figure 34:
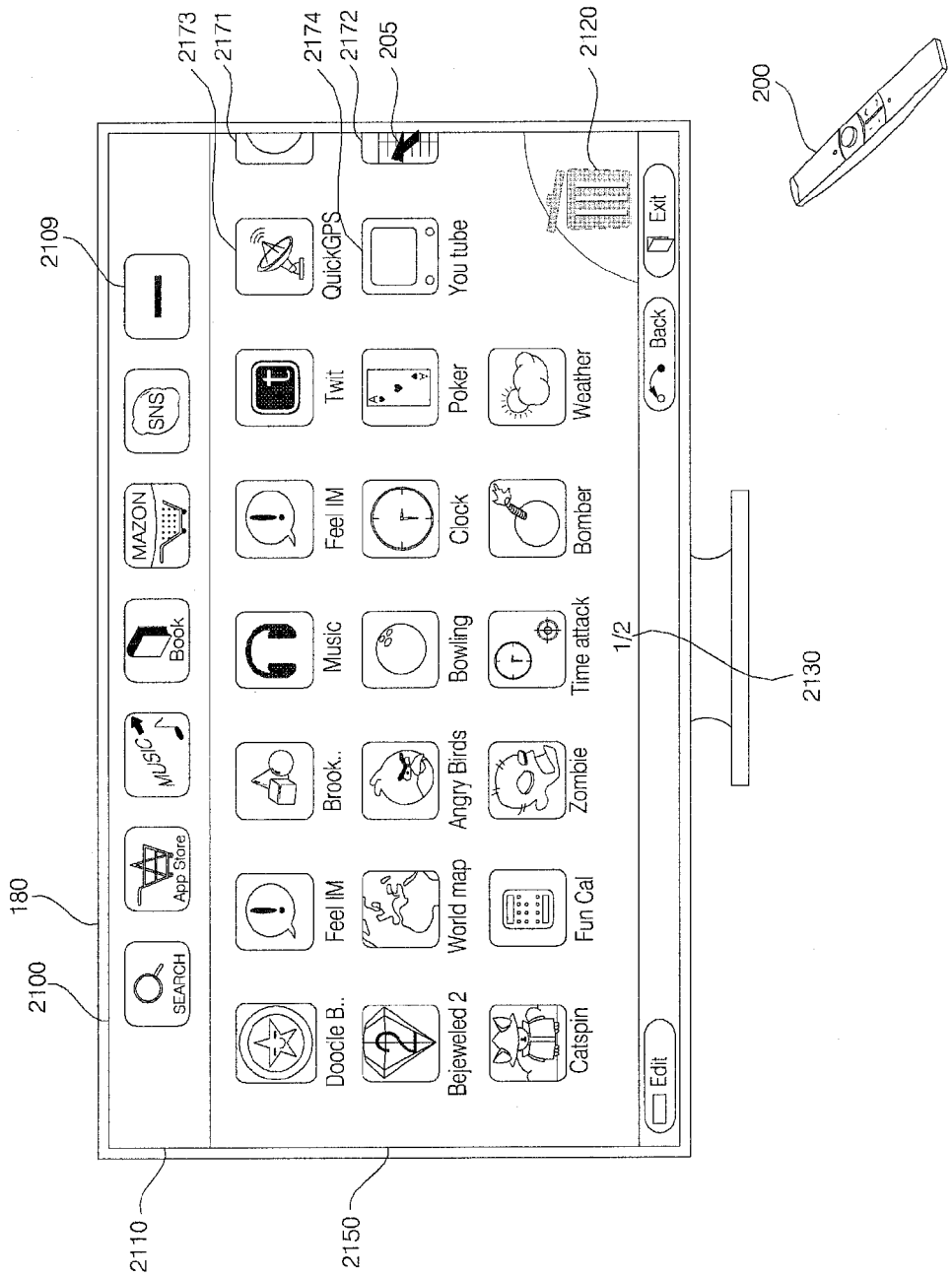
FIGS. 34, 35 and 36 show views of the image display apparatus to illustrate the method of FIG. 33.

A full screen 2100 which includes a plurality of application items may be displayed on the display 180, as illustrated in FIG. 34, in step S2020. The full screen 2100 may include an application menu 2150. To be specific, the full screen 2100 may include an application compact-view menu 2110 and an extended application menu 2150 with additional application items. Each application menu may include a plurality of application items.

The full screen may include an application menu which may include at least one object that represents movement to the home screen, an object that represents deletion of an application item, or an object that indicates a current page number with respect to the total number of pages.

The application compact-view menu 2110 is similar to the application menu 1305 illustrated in FIG. 19, except that a compact-view application item (−) 2109 replaces the view more application item (+) 1309 as a mandatory application item. That is, upon selection of the compact-view application item (−) 2109, the home screen as illustrated in FIG. 19 may be displayed. In other words, when the display apparatus enters the compact-view mode of the application menu, the application menu 1305 of the home screen may be displayed.

The extended application menu 2150 may include, among application items installed in the image display apparatus, application items that are not displayed in FIG. 19. The extended application menu 2150 may further include an object 2120 which may represent deletion of an application item and an object 2130 that represents the current page number with respect to the total number of pages for the full screen 2100.

Meanwhile, the extended application menu 2150 may include a plurality of fully displayed application items 2173 and 2174 as well as a plurality of partially displayed application items 2171 and 2172. The partially displayed application items 2171 and 2172 may indicate the existence of a next page. Upon selection of the partially displayed application item 2171 or 2172, the full screen 2100 may turn to the next page to display additional application items. Upon selection of a partially displayed application item, in step S2030, the displayed extended menu screen may be switched to display a previous or next screen, in step S2040.

FIGS. 34 and 35 show display exemplary display images to illustrate the method of FIG. 33. Referring to FIGS. 34 and 35, upon a selection of the partially application item 2171 or 2172 of FIG. 34, the full screen 2100 may turn to the next page which may include a new extended application menu 2180, as shown in FIG. 35. Preferably, the application compact-view menu 2110 may still displayed. Accordingly, the user may readily identify added application items.

As the user turns to the next page, the partially displayed application items 2171 and 2172 of FIG. 34 may now be fully displayed as application items 2181 and 2182, respectively, as shown in FIG. 35. The application items 2173 and 2174 which were fully displayed in FIG. 34, may now be partially displayed at the left side in FIG. 35. Accordingly, the existence of a previous page may be indicated. Upon selection of the application item 2183 or 2184, as shown in FIG. 35, the previous page may be displayed. The partially displayed application items may be placed at the leftmost or rightmost positions among the plurality of displayed application items. Alternatively or additionally, the partially displayed application items may be placed at the top or bottom side among the plurality of displayed application items.

FIG. 36 illustrates exemplary display images that display partially displayed application items. The application items 2191 and 2192 may be partially displayed at the bottom of the extended application menu 2150 to indicate that the current page does not contain all of available application items. In this embodiment, the application items 2191 and 2192 may function to allow the displayed page to be switched from one page to another. For example, upon selection of the application item 2191 or 2192, the extended application menu 2150 may be changed to a next page and a new extended application menu may be displayed. When changing the displayed page, the page may be scrolled to provide an effect of sliding the displayed application items across (or up) the screen. Alternatively, the display of the extended application menu 2150 may be instantly changed.

Figure 37:
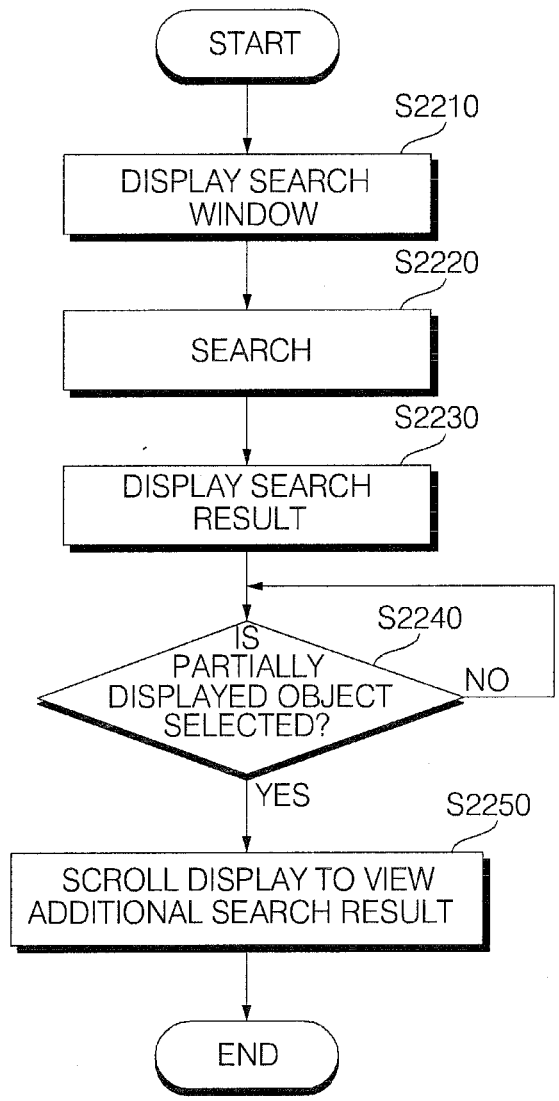
FIG. 37 is a flowchart illustrating a method for operating an image display apparatus according to a further embodiment of the present disclosure.

FIG. 37 is a flowchart of a method for operating an image display apparatus according to a further embodiment of the present disclosure. FIGS. 38 to 41 are images of the display screen to illustrate the method of FIG. 37. Referring to FIG. 37, upon receipt of a search input from the user, the controller 170 may control to the display apparatus to display a search window on at least a part of the display 180, in step S2210. The search window may be displayed separately from a displayed image or overlaid on the displayed image.

Subsequently, a search may be performed based on a keyword entered in the search window, in step S2220. The search keyword may be entered using an external input device connected to the image display appartus 100 via the external device interface 135. Moreover, the search keyword may be entered through a local key positioned on the display apparatus 100, or through a character key provided on the remote controller 200.

If a visual keyboard is displayed on the display 180, each character of the keyword may be entered by using a local key or through manipulation of the remote controller 200. If a touch screen display is provided, the keyword may be entered by touching the keys at the display. Moreover, a keyword may also be entered through voice recognition. In this case, the controller 170 may include a voice recognition algorithm. A voice signal may be received through a microphone connected to the image display apparatus 100. Alternatively, a microphone may be provided on the remote controller 200 to provide the voice commands to the controller 170. Then, the controller 170 may generate appropriate control signals by translating the received voice commands through the voice recognition algorithm in real time.

Figure 38:
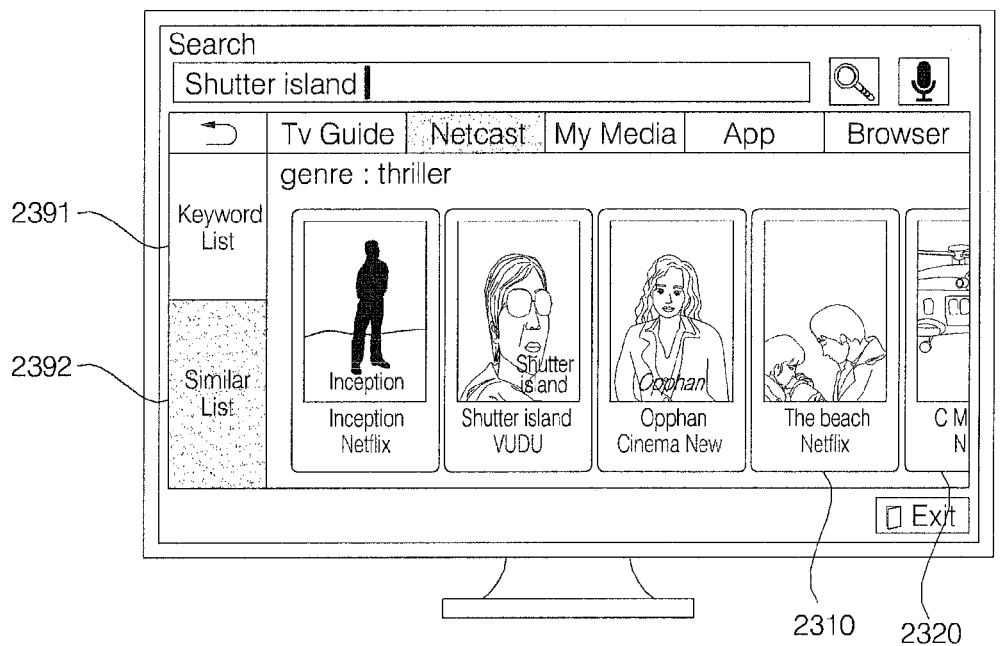
FIGS. 38 to 41 show views of search screens to illustrate the method of FIG. 37.

Then, a search result image that includes a plurality of objects 2310 and 2320 (as shown in FIG. 38) which correspond to the search result may be displayed, in step S2230. Specifically, the controller 170 may perform a search based on the keyword and may display the search results on the display 180. When the Keyword List button 2391 is selected, the displayed search result may include content which includes the entered search keyword. Moreover, when the Similar List button 2392 is selected, the displayed search result may include content which is similar to contents which includes the entered search keyword. For example, if "Shutter Island" is entered as a search keyword, as shown in FIG. 38, and the Similar List button 2392 is selected, similar content from the same genre (e.g., thriller) may be displayed as the search result.

Moreover, the search may be performed in the image display apparatus 100, an external device connected to the image display apparatus 100, or on a remote device connected through an external network through the network interface 135. While the controller 170 may perform the search when the contents are located locally (e.g., on an external device connected locally at the display apparatus 100), when the contents are located on a remote device, a search engine on an external network may be used instead of the controller 170. Upon selection of the partially displayed object 2320, in step S2240, the search results page may be changed to display the next page of search results, e.g., hidden objects, in step S2250.

Figure 39:
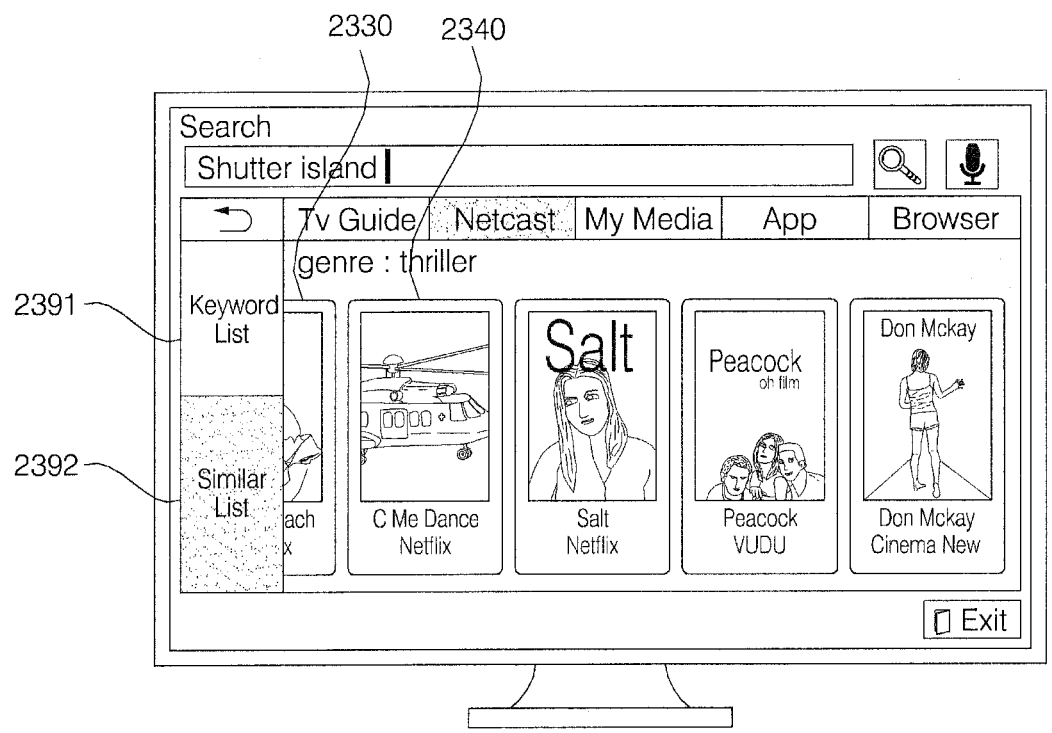

As the next search result page is displayed, the partially displayed object 2320 of FIG. 38 may be fully displayed as an object 2340, as shown in FIG. 39. Then, the search result object 2310 may be scrolled to the left to be partially displayed as an object 2330, as shown in FIG. 39. Accordingly, the partially displayed object 2330 may indicate the presence of the previous search result page. Moreover, upon selection of the partially displayed object 2330, the previous page may be displayed. A partially displayed object may be placed at the leftmost or rightmost position among a plurality of objects, or both sides, based on the presence of additional objects.

Figure 40:
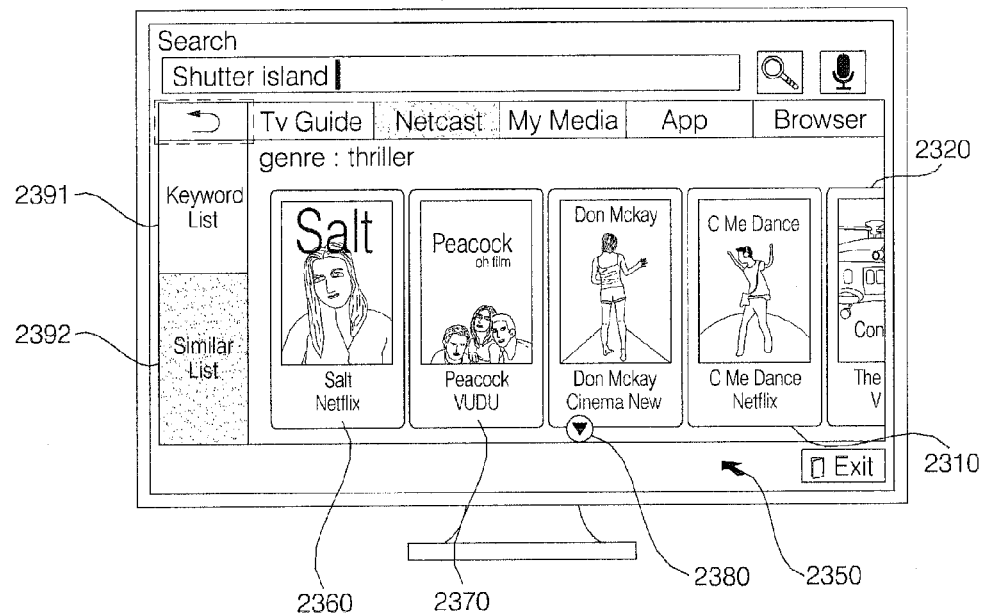

FIG. 40 illustrates a display screen image of a search result which may be included in multiple categories. Referring to FIG. 40, the displayed objects 2360, 2370 may fall into both categories "Similar List" (e.g., objects which represent similar content) and "Netcast" (e.g., objects which are available on service providers through Netcast). The objects 2360 and 2370 included in the search result may each include a word which is related to the search keyword. Moreover, if remote content is being searched, the search result may be provided for display at the display apparatus 100 by a service provider.

Referring again to FIG. 40, the displayed search list includes content from the same genre, e.g., thriller. To display search results associated with a different genre, the up/down screen shift icons 2380 may be selected using a pointer 2350. The pointer 2350 may be controlled by a directional key of the remote controller, or another appropriate input device. Moreover, to display content which includes the search keyword, the keyword list button 2392 may be selected.

A search result object 2320 may be partially displayed at the rightmost position to indicate the presence of additional search results of the same genre. Upon selection of the partially displayed search result object, the search results screen may be changed to display the next page of search result objects.

Figure 41:
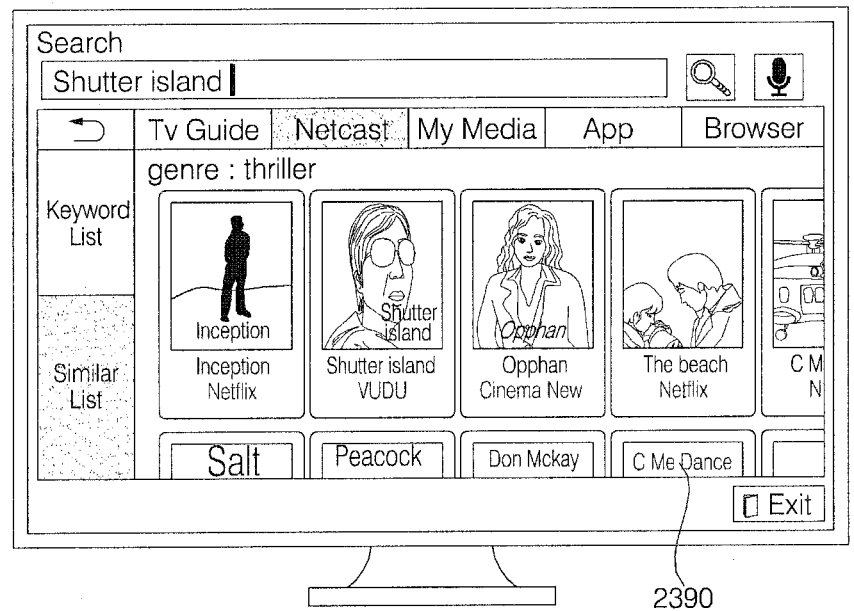

In certain embodiments, a partially displayed object may be positioned vertically, e.g., near the top or bottom side, among a plurality of objects. FIG. 41 illustrates a display screen image of a search result having partially displayed objects positioned near the top or bottom. In this embodiment, the partially displayed object 2390 may indicate presence of additional objects which may be hidden. Moreover, the hidden objects may be displayed without using the screen shift icons 2380 of FIG. 40. Here, a search result object 2390 may be partially displayed at the bottom and may be used to change the displayed page to another page. For example, upon selection of the search result object 2390, the search results page may be changed to display a new search result page. The displayed page may be configured to be scrolled (e.g. slide off the display) or may be changed instantly upon selection of the partially displayed object 2390.

Figure 42:
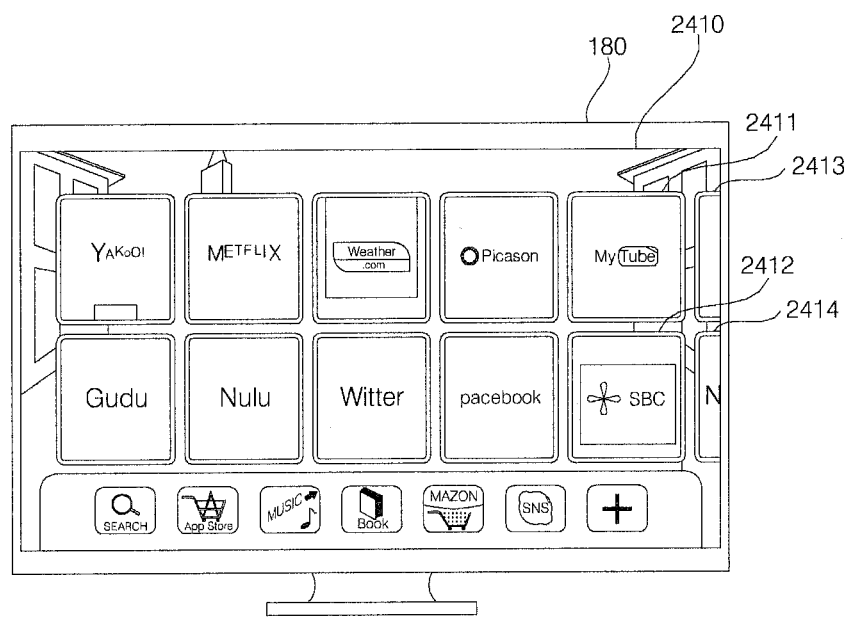
FIGS. 42, 43 and 44 show views of the image display apparatus according to another embodiment of the present disclosure.
Figure 43:
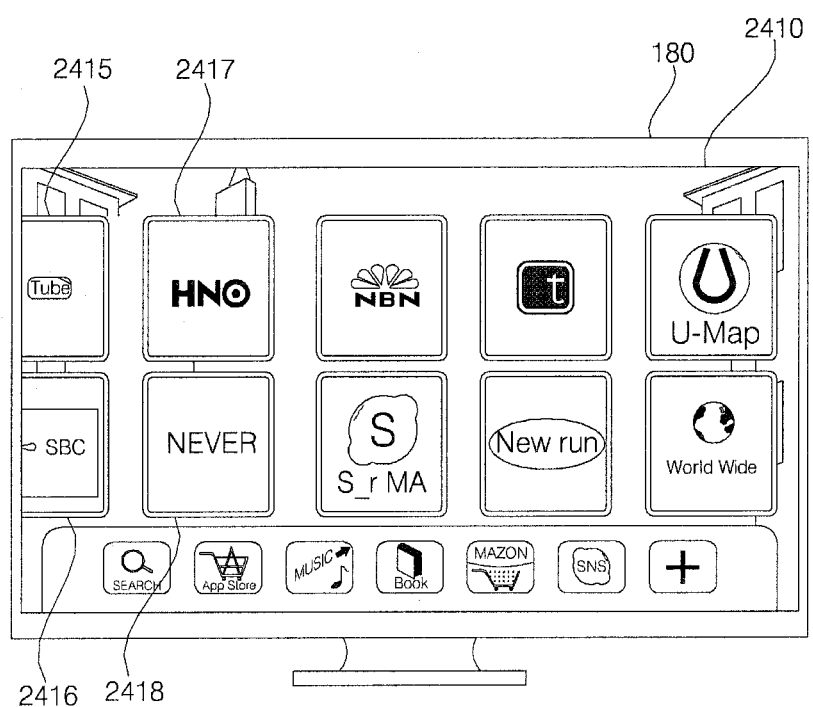
Figure 44:
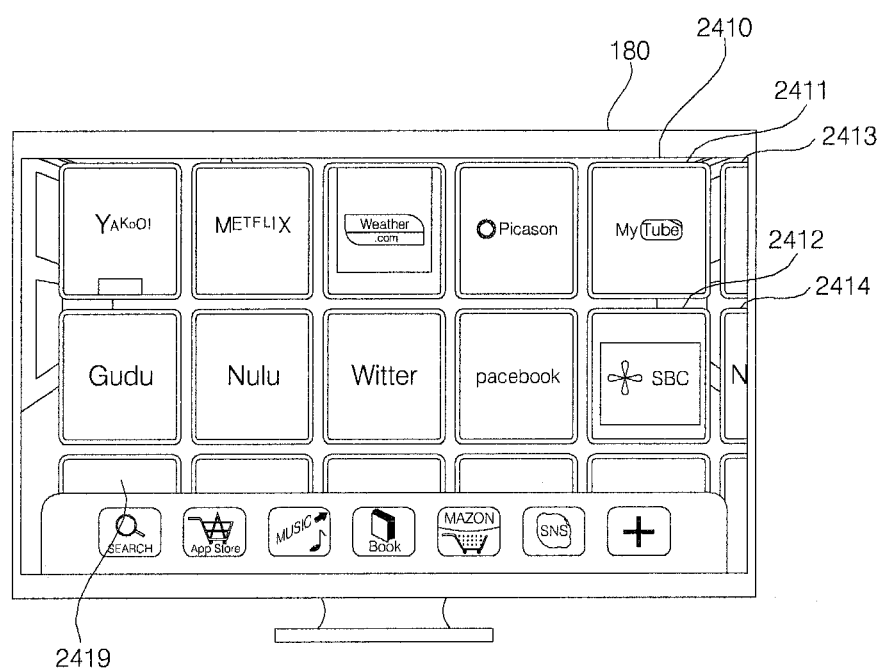

FIGS. 42, 43 and 44 are exemplary display screen images to control a display of graphical objects according to an embodiment of the present disclosure. Hereinafter, the term "graphical object" may include objects as described with reference to FIGS. 42, 43 and 44 as well as objects, items, and icons as described with reference to FIGS. 19 to 41.

When a card object 1320 is selected that represents CPs on the home screen of FIG. 19 (e.g., the Netcast card object), additional CP objects may be displayed on the display 180, as illustrated in FIG. 42. The CP objects may be icons that include identifying information (e.g., logos, names, video clips, etc.). Thus, the plurality of displayed CPs may easily be identified. While a CP list is shown in FIG. 42 as listing 10 CPs objects (Yakoo, Metflix, Weather.com, Picason, My Tube, Gudu, Nulu, Witter, pacebook, and SBC), the number of CP objects listed on a single screen may be changed. For example, the size of the CP objects may be made smaller to display a greater number of CP objects on a single display.

Partially displayed objects 2413, 2414 may be provided to indicate availability of additional CP objects. Upon selection of a partially displayed object 2413 or 2414, the selected object may be fully displayed as an object 2417 or 2418, as shown in FIG. 43. Along with the object 2417 or 2418, other previously hidden CP objects may be displayed on the display 180.

CP objects 2411 and 2412 which are fully displayed in FIG. 42 may be partially displayed as CP objects 2415 and 2416 at the leftmost positions in FIG. 43. Hence, the presence of additional CP objects which are not displayed may be indicated by the display of CP objects 2415 and 2416. Upon selection of the CP object 2415 or 2416, the previous page may be displayed. Moreover, a partially displayed object may be placed at the top or bottom of the object display area to indicate presence of additional objects at the top or bottom of the CP list, respectively.

Referring to FIG. 44, in addition to the partially displayed CP objects 2413, 2414 positioned horizontally, a partially displayed CP object 2419 may be positioned adjacent to the bottom row of the displayed CP objects. This CP object 2419 may indicate to a user that additional CP objects are available near the bottom of the displayed list. Upon selection of the CP object 2419, the displayed CP list may be scrolled up or changed to display another page of CP objects.

For example, the displayed CP list may be scrolled, for example, using a remote controller 200. Once the partially displayed CP object 2419 is selected, the displayed CP objects may be replaced with CP object 2419 and additional new CP objects. Because all the CP objects are replaced (e.g., the entire page of CP objects is scrolled to display the next page), it may not be necessary for the user repeatedly scroll down the list. However, it should be appreciated that a selection of the partially displayed object 2419 may scroll the displayed image by one row of CP objects (e.g., object 2419 may be fully displayed as well as the row including object 2412, while the row including object 2411 may now be hidden).

The image display apparatus and the method of controlling the same, as embodied and broadly described herein, may increase user convenience and overall effectiveness of the user interface (UI) by providing a more intuitive graphical interface. The image display apparatus may be a multifunctional display device. The image display apparatus may be equipped to provide multimedia content received over a network as well as broadcast content received from a broadcast provider. Thus, the image display apparatus may be provided with various types of user-friendly input devices such as a handwriting input device, a touch screen, a pointing device, or another appropriate type of input device. Furthermore, because the image display apparatus may be connected to the Internet, it may be configured to provide various functions including e-mail, web browsing, online banking, gaming, or another appropriate type of online activity by connecting directly to the Internet or a computer having Internet access. Moreover, to implement these functions, the image display apparatus may operate based on a standard general-purpose Operating System (OS).

Various applications may be freely added to or deleted from, for example, a general-purpose OS kernel in the image display apparatus. Hence, the image display apparatus may be configured as a network TV, a Hybrid broadcast broadband TV (HbbTV), a smart TV, or another appropriate type of networked display device. Moreover, the image display apparatus may be implemented on a smart phone, as needed.

The image display apparatus may display various types of content including still or video images as well as multimedia content. The image display apparatus may also display broadcast programs which may be selected from among a plurality of broadcast programs transmitted from broadcasting stations. The broadcast programs may be digital content.

Digital broadcasting may offer many advantages over analog broadcasting. For example, digital broadcasting may provide improved noise cancelation, reduced data loss, improved error correction as well as the ability to provide higher resolution images, such as high-definition content. Moreover, digital broadcasting may allow for interactive viewer services to be provided to the end user.

In an embodiment, the image display apparatus may provide a user interface that includes a plurality of icons and card objects representing a plurality of content which may be accessed, for example, over the Internet. At least one of the plurality of icons may be partially displayed to indicate to the user that additional icons or card objects are available. A selection of the partially displayed icons or card objects may scroll the displayed objects to display the additional icons or card objects.

In accordance with an aspect of the present disclosure, a method for operating an image display apparatus may include displaying a home screen on a display, the home screen having a plurality of card objects and an application menu with at least one application item, and upon selection of a first card object which is partially displayed on the display from among the plurality of card objects, fully displaying the selected first card object, moving at least one of the card objects displayed on the display to a hidden area, and displaying at least one of card objects hidden in the hidden area on the display.

In accordance with another aspect of the present disclosure, a method for operating an image display apparatus may include using a partially displayed graphic object as a page switching or screen switching menu, among a plurality of graphic objects displayed on various screens. In accordance with a further aspect of the present disclosure, an image display apparatus may include a user input interface which may receive an input related to a plurality of graphic objects, and a controller which may, upon selection of a partially displayed graphic object from among the plurality of graphic objects, control a display of a hidden graphic object.

A method of controlling a display on a multifunctional display device, as embodied and broadly described herein, may include displaying a first card object in a first area of the display, the first card object configured to display a video image; displaying a second card object in a second area of the display, the second card object having at least one link for connecting to a content provider or to a storage device; displaying a third card object in a third area of the display such that the third card object is partially displayed on the display; receiving a request to change the displayed card objects; and displaying, in response to the request, the third card object in the second area of the display and partially displaying a fourth card object in the third area of the display.

In this embodiment, a width of the partially displayed portion of the third or fourth card object may be less than a width of a hidden portion of the third or fourth card object. The third area of the display may be positioned at an outside edge of the display such that the partially displayed portion of the third or fourth card object is displayed at the outside edge of the display. The second area of the display may be positioned adjacent to the first area of the display, and the third area may be positioned adjacent to the second area opposite the first area.

Moreover, the displaying the third card object in the second area of the display may include partially displaying the second card object in a fourth area of the display, the fourth area positioned between the first area and the second area, wherein a selection of the second card object displayed in the fourth area of the display causes the second card object to be displayed in the second area of the display and the third card object to be partially displayed in the third area of the display. Moreover, displaying the third card object in the second area of the display may include scrolling the third card object across the display from the third area to the second area and scrolling the second card object across the display from the second area to the fourth area.

The at least one link may include a URL configured to retrieve a multimedia content stored on the content server. The at least one link corresponds to a channel in a broadcast signal, and wherein a selection the at least one link tunes a tuner in the multifunctional display device to the channel. The at least one link is an icon.

In this embodiment, the third card object may include at least one thumbnail corresponding to at least one of a broadcast content, content stored on the content server, or content stored on the storage device, wherein the at least one thumbnail includes a still image or a video image representative of the corresponding content. A selection of the at least one thumbnail may cause the at least one of a broadcast content, content stored on the content server, or content stored on the storage device to be retrieved for display on the display. Moreover, the displayed content is displayed as a full screen image on the display. Alternatively, if the thumbnail corresponds to a video content, the video content may be displayed in the first card object.

The video image displayed in the first card object may also be at least one of a broadcast video received at a tuner provided in the multifunctional display device, a streaming video received at a network interface provided in the multifunctional display device, or a video stored on a storage device provided in the multifunctional display device. Furthermore, the receiving the request to change the displayed card objects may include detecting a selection of the third card object displayed in the third area of the display, the third card object being selected using a cursor on the display that is controlled by a motion sensing remote controller.

In one embodiment, a multifunctional display apparatus may include a tuner configured to tune to a channel of a broadcast signal; a network interface configured to receive data packets; a display module; a wireless input interface to receive signals from a remote controller; a storage device to store data; a processor to control the display module based on a signal from the remote controller. Here, a first area of the display module may display a first card object configured to display a video received through a channel of the broadcast signal tuned by the tuner, a second area of the display module may display a second card object having at least one link configured to access a content server or a local storage device, and a third area of the display module may partially displays a third card object, and wherein the signal from the remote controller causes the processor to control the display module to display the third card object in the second area of the display module and partially display a fourth card object in the third area of the display module.

In another embodiment, a method of controlling a display on a multifunctional display device may include displaying at least one first icon in a first area of the display; displaying at least one second icon in a second area of the display such that the second icon is partially displayed on the display, wherein the at least one first and second icons include at least one link for connecting to a server or to a storage device; receiving a selection of the at least one second icon; scrolling, in response to the selection, the at least one first icon out of the first area and scrolling the at least one second icon into the first area of the display, and partially displaying at least one third icon in the second area of the display.

In this method, selecting an icon displayed in the first area may cause the multifunctional display device to retrieve a corresponding content for display on the display, and selecting an icon displayed in the second area may cause the multifunctional display device to replace a displayed icon with a hidden icon.

Embodiments of the present disclosure are described in detail with reference to the attached drawings, but it should be understood that they are merely illustrative of the present disclosure and should not be interpreted as limiting the scope of the present disclosure. The terms "module" and "unit" used to refer to components are used herein to help in the understanding of the components, and thus, they should not be considered as having specific meanings or roles. Accordingly, the terms "module" and "unit" may be used interchangeably. In addition, although the terms used in the present disclosure are selected from generally known and used terms, some of the terms mentioned in the description of the present disclosure, the detailed meanings of which are described in relevant parts of the description herein, have been selected by the applicant at his or her discretion. Furthermore, the present disclosure must be understood, not simply by the actual terms used, but by the meanings of each term lying within.

The method for operating an image display apparatus according to the foregoing exemplary embodiments may be implemented as code that is written on a computer-readable recording medium and, can thus, be read by a processor. The computer-readable recording medium may be any type of recording device in which data is stored in a computer-readable manner. Examples of the computer-readable recording medium may include a ROM, a RAM, a CD-ROM, a magnetic tape, a floppy disc, an optical data storage, and a carrier wave (e.g., data transmission through the Internet). The computer-readable recording medium may be distributed over a plurality of computer systems connected to a network so that computer-readable code is written thereto and executed therefrom in a decentralized manner. Functional programs, code, and code segments needed to realize the embodiments herein may be construed by one of ordinary skill in the art.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a display on a multifunctional display device, comprising:

displaying a first card object in a first area of the display, the first card object configured to display a video image;

displaying a second card object in a second area of the display, the second card object having at least one link for connecting to a content provider or to a storage device;

displaying a third card object in a third area of the display such that the third card object is partially displayed on the display;

receiving a request to change the displayed card objects; and displaying, in response to the request, the third card object in the second area of the display and partially displaying a fourth card object in the third area of the display, wherein the displaying the third card object in the second area of the display includes partially displaying the second card object in a fourth area of the display, the fourth area positioned between the first area and the second area, and wherein displaying the third card object in the second area of the display includes scrolling the third card object across the display from the third area to the second area and scrolling the second card object across the display from the second area to the fourth area.

2. The method of claim 1, wherein a width of the partially displayed portion of the third or fourth card object is less than a width of a hidden portion of the third or fourth card object.

3. The method of claim 1, wherein the third area of the display is positioned at an outside edge of the display such that the partially displayed portion of the third or fourth card object is displayed at the outside edge of the display.

4. The method of claim 1, wherein the second area of the display is positioned adjacent to the first area of the display, and the third area is positioned adjacent to the second area opposite the first area.

5. The method of claim 1, wherein a selection of the second card object displayed in the fourth area of the display causes the second card object to be displayed in the second area of the display and the third card object to be partially displayed in the third area of the display.

6. The method of claim 1, wherein the at least one link includes a URL configured to retrieve a multimedia content stored on the content server.

7. The method of claim 1, wherein the at least one link corresponds to a channel in a broadcast signal, and wherein a selection the at least one link tunes a tuner in the multifunctional display device to the channel.

8. The method of claim 1, wherein the at least one link is an icon.

9. The method of claim 1, wherein the third card object includes at least one thumbnail corresponding to at least one of a broadcast content, content stored on the content server, or content stored on the storage device.

10. The method of claim 9, wherein the at least one thumbnail includes a still image or a video image representative of the corresponding content.

11. The method of claim 9, wherein a selection of the at least one thumbnail causes the at least one of a broadcast content, content stored on the content server, or content stored on the storage device to be retrieved for display on the display.

12. The method of claim 11, wherein the displayed content is displayed as a full screen image on the display.

13. The method of claim 11, wherein, if the thumbnail corresponds to a video content, the video content is displayed in the first card object.

14. The method of claim 1, wherein the video image displayed in the first card object is at least one of a broadcast video received at a tuner provided in the multifunctional display device, a streaming video received at a network interface provided in the multifunctional display device, or a video stored on a storage device provided in the multifunctional display device.

15. The method of claim 1, wherein
the receiving the request to change the displayed card objects includes detecting a selection of the third card object displayed in the third area of the display, the third card object being selected using a cursor on the display that is controlled by a motion sensing remote controller.

16. A multifunctional display apparatus, comprising:
a tuner configured to tune to a channel of a broadcast signal;
a network interface configured to receive data packets;
a display module;
a wireless input interface to receive signals from a remote controller;
a storage device to store data; and
a processor to control the display module based on a signal from the remote controller, wherein:
a first area of the display module displays a first card object configured to display a video received through a channel of the broadcast signal tuned by the tuner,
a second area of the display module displays a second card object having at least one link configured to access a content server or a local storage device, and
a third area of the display module partially displays a third card object, and
wherein
the signal from the remote controller causes the processor to control the display module to display the third card object in the second area of the display module and partially display a fourth card object in the third area of the display module,
wherein the displaying the third card object in the second area of the display includes partially displaying the second card object in a fourth area of the display, displaying the third card object in the second area of the display includes scrolling the third card object across the display from the third area to the second area and scrolling the second card object across the display from the second area to the fourth area, and wherein the signal from the remote controller is generated by a touch input at the remote controller to scroll the card objects.

17. A method of controlling a display on a display device, comprising:
displaying at least one first icon in a first area of the display;
displaying at least one second icon in a second area of the display such that the second icon is partially displayed on the display, wherein the at least one first and second icons include at least one link for connecting to a content provider or to a storage device;
receiving a selection of the at least one second icon;
scrolling, in response to the selection, the at least one first icon out of the first area and scrolling the at least one second icon into the first area of the display; and
partially displaying at least one third icon in the second area of the display, wherein
selecting an icon displayed in the first area causes the display device to execute a corresponding content for display on the display, and
selecting an icon displayed in the second area causes the display device to display a hidden icon.

18. A method of controlling a display on a display device, comprising:
displaying a first card object on the display, the first card object configured to display a video;
displaying at least one second card object on the display, the second card object having at least one link for accessing content;
partially displaying a third card object in a first area of the display and partially displaying a fourth card object in a second area of the display, the first and second areas corresponding to opposite edges of the display;

receiving a prescribed request to change the displayed card objects; and moving the card objects in response to the request, wherein the fourth card object is fully displayed and the second card object is partially displayed in the first area of the display, wherein receiving the prescribed request includes receiving a wireless signal corresponding to at least one of a user motion or an input at a remote controller.

19. The method of claim 18, wherein the first area is provided near the left edge of the display and the second area is provided near the right edge of the display.

20. The method of claim 18, wherein, in response to another request, the third card object is fully displayed and the first card object is moved for partial display in the second area of the display.

21. The method of claim 18, wherein the first card object is not moved when the second card object is moved to the first or second area of the display.

22. The method of claim 18, wherein the at least one link is an icon or a thumbnail including a still image or a video image representative of the corresponding content.

23. The method of claim 18, wherein the video displayed in the first card object is at least one of a broadcast video received at a tuner provided in the display device, or a video stored on a storage device provided in the display device.

24. The method of claim 18, wherein the card objects include a border displayed along an outer edge of the card objects.

25. A display apparatus, comprising:
a display;
a tuner configured to tune to a channel of a broadcast signal;
a network interface configured to receive data packets;
a wireless interface to receive signals to receive wireless input signals;
a storage device to store data; and
a processor to control a display of a user interface on the display, wherein the processor is configured to
display a first card object which displays a video from the tuner, the network interface, or the storage device,
display a second card object which displays at least one link for accessing content,
partially display a third card object in a first area of the display,
partially display a fourth card object in a second area of the display, the first and second areas corresponding to opposite edges of the display, and
in response to an input received through the wireless interface, fully display the fourth card object and move the second card object to the first area for partial display,
wherein the input is a wireless signal corresponding to at least one of a user motion or an input at a remote controller.

26. The display apparatus of claim 25, wherein, in response to another request, the third card object is fully displayed and the first card object is moved for partial display in the second area of the display.

27. The display apparatus of claim 25, wherein the first card object is not moved when the second card object is moved to the first or second area of the display.

28. The display apparatus of claim 25, wherein the at least one link is an icon or a thumbnail including a still image or a video representative of the corresponding content.

29. The display apparatus of claim 25, wherein the video displayed in the first card object is at least one of a broadcast video received at a tuner provided in the multifunctional display device, a streaming video received at a network interface provided in the multifunctional display device, or a video stored on a storage device provided in the multifunctional display device.

30. The display apparatus of claim 25, wherein the card objects include a border displayed along an outer edge of the card objects.

* * * * *